United States Patent
Nord et al.

(10) Patent No.: US 9,451,044 B2
(45) Date of Patent: *Sep. 20, 2016

(54) METHODS AND SYSTEMS FOR PROVIDING A CONSISTENT PROFILE TO OVERLAPPING USER SESSIONS

(71) Applicant: Citrix Systems, Inc., Fort Lauderdale, FL (US)

(72) Inventors: Joseph Nord, Lighthouse, FL (US); Richard Hayton, Cambridge (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 336 days.

This patent is subject to a terminal disclaimer.

(21) Appl. No.: 14/259,586

(22) Filed: Apr. 23, 2014

(65) Prior Publication Data

US 2014/0237049 A1 Aug. 21, 2014

Related U.S. Application Data

(63) Continuation of application No. 12/772,980, filed on May 3, 2010, now Pat. No. 8,725,791.

(60) Provisional application No. 61/174,996, filed on May 2, 2009.

(51) Int. Cl.
*H04L 29/08* (2006.01)

(52) U.S. Cl.
CPC .................................. *H04L 67/306* (2013.01)

(58) Field of Classification Search
None
See application file for complete search history.

(56) References Cited

U.S. PATENT DOCUMENTS

| 4,893,307 | A | 1/1990 | McKay et al. |
| 5,021,949 | A | 6/1991 | Morten et al. |
| 5,442,771 | A | 8/1995 | Filepp et al. |
| 5,754,939 | A | 5/1998 | Herz et al. |
| 5,867,494 | A | 2/1999 | Krishnaswamy et al. |
| 5,915,001 | A | 6/1999 | Uppaluru |

(Continued)

FOREIGN PATENT DOCUMENTS

| WO | WO-00/43879 A2 | 1/2004 |
| WO | WO-2007/024647 A2 | 3/2007 |
| WO | WO-2008/051842 A2 | 5/2008 |

OTHER PUBLICATIONS

European Communication on 10717012.8 dated Dec. 14, 2011.

(Continued)

*Primary Examiner* — Scott B Christensen
*Assistant Examiner* — Sean Concannon
(74) *Attorney, Agent, or Firm* — Foley & Lardner LLP; John D. Lanza

(57) ABSTRACT

Just in time delivery of a consistent user profile to overlapping user sessions, where a first user session issues a request for a first file of a user profile to a server agent. Upon receiving the request, the server agent retrieves the first file from a base user profile, and just in time delivers the retrieved first file to the first user session. The user, via a second user session executing simultaneously with the first user session, issues a request to the server agent for the first file and a second file of the user profile. Upon receiving the request, the server agent identifies a modified version of the first file in a provisional user profile, retrieves the modified first file from the provisional user profile and the second file from the base user profile, and just in time delivers both files to the second user session.

18 Claims, 12 Drawing Sheets

(56) References Cited

U.S. PATENT DOCUMENTS

| | | |
|---|---|---|
| 5,933,412 A | 8/1999 | Choudhury et al. |
| 5,999,525 A | 12/1999 | Krishnaswamy et al. |
| 6,038,596 A | 3/2000 | Baldwin et al. |
| 6,157,953 A | 12/2000 | Chang et al. |
| 6,199,113 B1 | 3/2001 | Alegre et al. |
| 6,256,637 B1* | 7/2001 | Venkatesh ............... G06F 9/455 |
| 6,256,773 B1 | 7/2001 | Bowman-Amuah |
| 6,275,227 B1 | 8/2001 | Destefano |
| 6,289,382 B1 | 9/2001 | Bowman-Amuah |
| 6,292,933 B1 | 9/2001 | Bahrs et al. |
| 6,314,094 B1 | 11/2001 | Boys |
| 6,324,647 B1 | 11/2001 | Bowman-Amuah |
| 6,332,163 B1 | 12/2001 | Bowman-Amuah |
| 6,335,927 B1 | 1/2002 | Elliott et al. |
| 6,339,826 B2 | 1/2002 | Hayes et al. |
| 6,339,832 B1 | 1/2002 | Bowman-Amuah |
| 6,345,239 B1 | 2/2002 | Bowman-Amuah |
| 6,370,573 B1 | 4/2002 | Bowman-Amuah |
| 6,400,806 B1 | 6/2002 | Uppaluru |
| 6,400,996 B1 | 6/2002 | Hoffberg et al. |
| 6,405,364 B1 | 6/2002 | Bowman-Amuah |
| 6,427,132 B1 | 7/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,452,923 B1 | 9/2002 | Gerszberg et al. |
| 6,453,343 B1* | 9/2002 | Housel, III ............. H04L 29/06 709/213 |
| 6,473,794 B1 | 10/2002 | Guheen et al. |
| 6,477,580 B1 | 11/2002 | Bowman-Amuah |
| 6,477,665 B1 | 11/2002 | Bowman-Amuah |
| 6,490,587 B2 | 12/2002 | Easty et al. |
| 6,496,850 B1 | 12/2002 | Bowman-Amuah |
| 6,502,102 B1 | 12/2002 | Haswell et al. |
| 6,502,213 B1 | 12/2002 | Bowman-Amuah |
| 6,510,417 B1 | 1/2003 | Woods et al. |
| 6,515,968 B1 | 2/2003 | Combar et al. |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,601,057 B1 | 7/2003 | Underwood et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,609,128 B1 | 8/2003 | Underwood |
| 6,611,822 B1 | 8/2003 | Beams et al. |
| 6,611,867 B1 | 8/2003 | Bowman-Amuah |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,629,081 B1 | 9/2003 | Cornelius et al. |
| 6,633,878 B1 | 10/2003 | Underwood |
| 6,636,242 B2 | 10/2003 | Bowman-Amuah |
| 6,636,878 B1* | 10/2003 | Rudoff ............. G06F 17/30067 |
| 6,640,145 B2 | 10/2003 | Hoffberg et al. |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,662,357 B1 | 12/2003 | Bowman-Amuah |
| 6,671,818 B1 | 12/2003 | Mikurak |
| 6,687,734 B1 | 2/2004 | Sellink et al. |
| 6,697,824 B1 | 2/2004 | Bowman-Amuah |
| 6,701,345 B1 | 3/2004 | Carley et al. |
| 6,701,514 B1 | 3/2004 | Haswell et al. |
| 6,704,873 B1 | 3/2004 | Underwood |
| 6,714,979 B1 | 3/2004 | Brandt et al. |
| 6,715,145 B1 | 3/2004 | Bowman-Amuah |
| 6,718,535 B1 | 4/2004 | Underwood |
| 6,721,713 B1 | 4/2004 | Guheen et al. |
| 6,725,425 B1 | 4/2004 | Rajan et al. |
| 6,731,625 B1 | 5/2004 | Eastep et al. |
| 6,737,591 B1 | 5/2004 | Lapstun et al. |
| 6,742,015 B1 | 5/2004 | Bowman-Amuah |
| 6,754,181 B1 | 6/2004 | Elliott et al. |
| 6,760,748 B1 | 7/2004 | Hakim |
| 6,766,944 B2 | 7/2004 | Silverbrook et al. |
| 6,766,945 B2 | 7/2004 | Kia et al. |
| 6,772,213 B2 | 8/2004 | Glorikian |
| 6,789,731 B2 | 9/2004 | Kia et al. |
| 6,797,895 B2 | 9/2004 | Lapstun et al. |
| 6,830,196 B1 | 12/2004 | Silverbrook et al. |
| 6,831,682 B1 | 12/2004 | Silverbrook et al. |
| 6,832,717 B1 | 12/2004 | Silverbrook et al. |
| 6,842,906 B1 | 1/2005 | Bowman-Amuah |
| 6,843,420 B2 | 1/2005 | Paul et al. |
| 6,850,252 B1 | 2/2005 | Hoffberg |
| 6,859,212 B2 | 2/2005 | Kumar et al. |
| 6,867,880 B2 | 3/2005 | Silverbrook et al. |
| 6,871,346 B1 | 3/2005 | Kumbalimutt et al. |
| 6,885,736 B2 | 4/2005 | Uppaluru |
| 6,895,084 B1 | 5/2005 | Saylor et al. |
| 6,901,595 B2 | 5/2005 | Mukundan et al. |
| 6,904,449 B1 | 6/2005 | Quinones |
| 6,907,451 B1 | 6/2005 | Mukundan et al. |
| 6,907,546 B1 | 6/2005 | Haswell et al. |
| 6,909,708 B1 | 6/2005 | Krishnaswamy et al. |
| 6,950,990 B2 | 9/2005 | Rajarajan et al. |
| 6,954,736 B2 | 10/2005 | Menninger et al. |
| 6,957,186 B1 | 10/2005 | Guheen et al. |
| 6,963,908 B1 | 11/2005 | Lynch et al. |
| 6,976,090 B2 | 12/2005 | Ben-Shaul et al. |
| 6,980,962 B1 | 12/2005 | Arganbright et al. |
| 6,983,878 B2 | 1/2006 | Silverbrook et al. |
| 6,987,581 B2 | 1/2006 | Silverbrook et al. |
| 6,987,987 B1 | 1/2006 | Vacanti et al. |
| 6,995,859 B1 | 2/2006 | Silverbrook et al. |
| 6,996,778 B2 | 2/2006 | Rajarajan et al. |
| 7,006,881 B1 | 2/2006 | Hoffberg et al. |
| 7,013,290 B2 | 3/2006 | Ananian |
| 7,017,823 B2 | 3/2006 | Lapstun et al. |
| 7,023,979 B1 | 4/2006 | Wu et al. |
| 7,025,276 B2 | 4/2006 | Lapstun et al. |
| 7,027,055 B2 | 4/2006 | Anderson et al. |
| 7,034,953 B2 | 4/2006 | Silverbrook et al. |
| 7,035,907 B1 | 4/2006 | Decasper et al. |
| 7,039,606 B2 | 5/2006 | Hoffman et al. |
| 7,041,916 B2 | 5/2006 | Paul et al. |
| 7,047,279 B1 | 5/2006 | Beams et al. |
| 7,054,837 B2 | 5/2006 | Hoffman et al. |
| 7,055,739 B1 | 6/2006 | Lapstun et al. |
| 7,057,608 B2 | 6/2006 | Paul et al. |
| 7,069,234 B1 | 6/2006 | Cornelius et al. |
| 7,070,110 B2 | 7/2006 | Lapstun et al. |
| 7,072,843 B2 | 7/2006 | Menninger et al. |
| 7,076,736 B2 | 7/2006 | Hugh |
| 7,077,333 B2 | 7/2006 | Silverbrook et al. |
| 7,080,780 B2 | 7/2006 | Silverbrook et al. |
| 7,082,418 B2 | 7/2006 | Levy et al. |
| 7,085,683 B2 | 8/2006 | Anderson et al. |
| 7,085,755 B2 | 8/2006 | Bluhm et al. |
| 7,092,370 B2 | 8/2006 | Jiang et al. |
| 7,096,199 B2 | 8/2006 | Lapstun et al. |
| 7,097,106 B2 | 8/2006 | Silverbrook et al. |
| 7,100,195 B1 | 8/2006 | Underwood |
| 7,103,563 B1 | 9/2006 | Voisin et al. |
| 7,105,753 B1 | 9/2006 | Lapstun et al. |
| 7,107,285 B2 | 9/2006 | Von Kaenel et al. |
| 7,107,309 B1 | 9/2006 | Geddes et al. |
| 7,108,192 B2 | 9/2006 | Lapstun |
| 7,117,504 B2 | 10/2006 | Smith et al. |
| 7,120,596 B2 | 10/2006 | Hoffman et al. |
| 7,124,101 B1 | 10/2006 | Mikurak |
| 7,128,265 B2 | 10/2006 | Silverbrook et al. |
| 7,128,270 B2 | 10/2006 | Silverbrook et al. |

(56) References Cited

U.S. PATENT DOCUMENTS

| | | |
|---|---|---|
| 7,130,807 B1 | 10/2006 | Mikurak |
| 7,131,596 B2 | 11/2006 | Lapstun et al. |
| 7,132,612 B2 | 11/2006 | Lapstun et al. |
| 7,134,598 B2 | 11/2006 | Silverbrook et al. |
| 7,134,601 B2 | 11/2006 | Silverbrook et al. |
| 7,137,566 B2 | 11/2006 | Silverbrook et al. |
| 7,139,999 B2 | 11/2006 | Bowman-Amuah |
| 7,140,044 B2 | 11/2006 | Redlich et al. |
| 7,143,153 B1 | 11/2006 | Black et al. |
| 7,145,898 B1 | 12/2006 | Elliott |
| 7,146,617 B2 | 12/2006 | Mukundan et al. |
| 7,146,644 B2 | 12/2006 | Redlich et al. |
| 7,149,698 B2 | 12/2006 | Guheen et al. |
| 7,150,396 B2 | 12/2006 | Silverbrook et al. |
| 7,150,398 B2 | 12/2006 | Silverbrook et al. |
| 7,152,092 B2 | 12/2006 | Beams et al. |
| 7,152,207 B1 | 12/2006 | Underwood et al. |
| 7,156,289 B2 | 1/2007 | Silverbrook et al. |
| 7,159,777 B2 | 1/2007 | Silverbrook et al. |
| 7,165,041 B1 | 1/2007 | Guheen et al. |
| 7,167,844 B1 | 1/2007 | Leong et al. |
| 7,171,379 B2 | 1/2007 | Menninger et al. |
| 7,175,089 B2 | 2/2007 | Silverbrook et al. |
| 7,178,718 B2 | 2/2007 | Silverbrook et al. |
| 7,178,719 B2 | 2/2007 | Silverbrook et al. |
| 7,187,370 B2 | 3/2007 | Lapstun et al. |
| 7,188,769 B2 | 3/2007 | Silverbrook et al. |
| 7,191,252 B2 | 3/2007 | Redlich et al. |
| 7,197,374 B2 | 3/2007 | Silverbrook et al. |
| 7,197,502 B2 | 3/2007 | Feinsmith |
| 7,200,804 B1 | 4/2007 | Khavari et al. |
| 7,203,948 B2 | 4/2007 | Mukundan et al. |
| 7,207,483 B2 | 4/2007 | Silverbrook et al. |
| 7,207,485 B2 | 4/2007 | Silverbrook et al. |
| 7,209,949 B2 | 4/2007 | Mousseau et al. |
| 7,213,027 B1 | 5/2007 | Kominek et |
| 7,225,244 B2 | 5/2007 | Reynolds et al. |
| 7,225,979 B2 | 6/2007 | Silverbrook et al. |
| 7,231,657 B2 | 6/2007 | Honarvar et al. |
| 7,409,405 B1 | 8/2008 | Masinter et al. |
| 7,774,391 B1 * | 8/2010 | Le .................... G06F 17/30091 707/822 |
| 7,809,776 B1 * | 10/2010 | Witte ................ G06F 17/30144 707/825 |
| 2003/0046121 A1 | 3/2003 | Menninger et al. |
| 2003/0069803 A1 | 4/2003 | Pollitt |
| 2003/0191812 A1 | 10/2003 | Agarwalla et al. |
| 2003/0229900 A1 * | 12/2003 | Reisman .......... G06F 17/30873 725/87 |
| 2003/0233544 A1 | 12/2003 | Erlingsson |
| 2004/0031058 A1 | 2/2004 | Reisman |
| 2004/0073810 A1 | 4/2004 | Dettinger et al. |
| 2004/0190092 A1 | 9/2004 | Silverbrook et al. |
| 2004/0199575 A1 | 10/2004 | Geller |
| 2005/0091226 A1 * | 4/2005 | Lin .................... G06F 17/30902 |
| 2005/0097008 A1 | 5/2005 | Ehring et al. |
| 2005/0286466 A1 | 12/2005 | Tagg et al. |
| 2006/0031529 A1 | 2/2006 | Keith |
| 2006/0041635 A1 | 2/2006 | Alexander et al. |
| 2006/0069926 A1 | 3/2006 | Ginter et al. |
| 2006/0080415 A1 | 4/2006 | Tu |
| 2007/0239789 A1 * | 10/2007 | Bhat .................... G06Q 10/06 |
| 2007/0297378 A1 | 12/2007 | Poyhonen et al. |
| 2007/0300185 A1 | 12/2007 | MacBeth et al. |
| 2008/0015878 A1 | 1/2008 | Feng et al. |
| 2009/0024991 A1 * | 1/2009 | Campbell ............... H04L 67/06 717/173 |
| 2009/0164239 A1 | 6/2009 | Hayter et al. |
| 2009/0182778 A1 * | 7/2009 | Tormasov .......... G06F 17/30165 |
| 2009/0216975 A1 * | 8/2009 | Halperin ............. G06F 9/45537 711/162 |
| 2009/0240904 A1 * | 9/2009 | Austruy .............. G06F 11/1662 711/162 |
| 2009/0254590 A1 * | 10/2009 | Shlomai ................ G06Q 10/10 |
| 2010/0211554 A1 * | 8/2010 | Reid ................. G06F 17/30368 707/703 |
| 2010/0241479 A1 * | 9/2010 | Chaushev ...... G06Q 10/063114 705/7.15 |

OTHER PUBLICATIONS

International Preliminary Report on Patentability on PCT/US2010/033448 dated Nov. 17, 2011.
International Search Report on PCT/US2010/033448 dated Oct. 13, 2010.
Notice of Allowance on U.S. Appl. No. 12/772,980 dated Jan. 8, 2014.
Office Action on U.S. Appl. No. 12/772,980 dated Oct. 22, 2013.
Office Action on U.S. Appl. No. 12/772,980 dated Mar. 28, 2013.
Written Opinion on PCT/US2010/033448 dated Oct. 13, 2010.

* cited by examiner

US 9,451,044 B2

METHODS AND SYSTEMS FOR PROVIDING A CONSISTENT PROFILE TO OVERLAPPING USER SESSIONS

RELATED APPLICATIONS

This application claims the benefit of priority under 35 U.S.C. §120 as a continuation of U.S. patent application Ser. No. 12/772,980, filed May 3, 2010, which claims the benefit of priority under 35 U.S.C. §119 to U.S. Provisional Patent Application Ser. No. 61/174,996, filed on May 2, 2009, each of which are incorporated by reference herein in their entirety.

FIELD OF THE DISCLOSURE

This disclosure relates generally to providing user profiles. In particular, the disclosure relates to streaming a consistent user profile.

BACKGROUND OF THE DISCLOSURE

Systems that remotely provide applications can remotely provide users with application instances configured according to a user's settings and dedicated to a user during the length of a user session. When a user accesses a remote application, the user can log onto a remote server that can execute a remote application that is able to intercept or receive user application execution requests, and respond to the requests by instantiating an instance of the requested application on the remote server. A user can access the application instances by either remotely interacting with the application via a presentation level protocol or by receiving a stream of application files from a file or application server. In instances where the user wishes to receive files and data from the user profile at a delayed point in time (or "just-in-time"), delivery of the files and data may be delayed until after the user logs into a machine. Delaying data and file delivery to a execution machine can speed system logon performance. Further, there may be consistency problems between the file and data versions delivered to a user because the user may receive multiple versions of the user profile when the user modifies the data and files post-login and logs on to more than one machine at one time. For example when one or more files are changed by the user while the user is logged into a first user session at one point in time, and one or more files are changed by the user while the user is logged into a second user session at another point in time; inconsistencies can arise when the first and second user sessions overlap such that there exists a point in time when both the first and the second user session execute substantially simultaneously. In this instance, a user may receive an inconsistent profile because the changes made to the files in the first user session may not be reflected in the files streamed to the user during the second user session and cross file consistency issues can arise if one file references files separately changed in a second session.

An example of how this can occur is displayed in FIG. 1A. Illustrated in FIG. 1A is a scenario where a user receives File B during a first login session and again during a second login session. The user changes File B during the second login session and writes the changed file to the user's base user profile upon logging off of the second login session, the change made to File B during the second login session is not reflected in the profile streamed to the user during the first login session which persists past the point in time when the second login session ends. Therefore when the user requests File B, the version delivered to the user is inconsistent with the most recent version of the file, e.g. the version modified during the second login session and stored in the user's base user profile.

An example of how to mitigate user profile inconsistencies is described in FIG. 1B which illustrates a system where each change to a file is reflected in a delta storage repository. Thus, each time a change is made to files within the user profile, the changes are copied to a delta storage repository and are not merged into the base user profile until the associated user session ends. What can result over time is a potentially large number of copies of the user profile. Such a system can be very complex, can include multiple points of failure and can require a great deal of memory. Thus, methods and systems are needed to mitigate profile inconsistencies that are simple and require a reduced amount of memory.

SUMMARY OF THE DISCLOSURE

In one aspect, described herein is a method for just in time delivery of a consistent user profile to overlapping user sessions. A server agent executing on a computer, receives a request from a first user session for a first file of a user profile of a user. Responsive to receiving the first user session request, the server agent retrieves the first file from a base user profile of the user. The server agent just in time delivers the first file to the first user session, and receives a request from a second user session for the first file and a second file of the user profile, where the second user session and the first user session execute simultaneously. In response to receiving the second user session request, the server agent identifies a modified version of the first file in a provisional user profile of the user. Upon identifying the modified first file in the provisional user profile, the server agent retrieves the modified first file from the provisional user profile and the second file from the base user profile. The server agent, upon retrieving the files, just in time delivers the modified first file and the second file to the second user session.

In some embodiments, the base user profile comprises a version of the user profile of the user. In other embodiments, the provisional user profile comprises a version of the user profile of the user.

In other embodiments, retrieving the first file from a base user profile can include searching, by the server agent, the provisional user profile for a version of the first file. The server agent, in response to failing to locate a version of the first file in the provisional user profile, retrieves the first file from the base user profile.

The first user session, in some embodiments, modifies the first file prior to identifying the modified version of the first file in the provisional user profile. The server agent, in some embodiments, stores the modified first file in the provisional user profile responsive to the first user session modification of the first file.

In one embodiment, the server agent determines the first user session and the second user session terminated, and merges the provisional user profile with the base user profile. The server agent then removes substantially all profile information from the provisional user profile. Merging, in some embodiments, includes identifying files residing in both the provisional user profile and the base user profile, and replacing the files in the base user profile with the files in the provisional user profile. Merging, in other embodiments, includes identifying files residing in the provisional user profile and not residing in the base user profile, and copying the files in the base user profile. Merging, in still other embodiments, includes comparing a provisional file directory in the provisional user profile to a base file directory in the base user profile, where the provisional file directory tracks changes made to file paths and file names. The file paths and file names are then updated within the base file directory according to the provisional file directory.

In still other aspects, described herein is a system for just in time delivery of a consistent user profile to overlapping user sessions. The system can include a user profile of a user, a base user profile of the user, and a provisional user profile of the user. The system can further include a server agent that executes on a computer to receive a request from a first user session for a first file of the user profile, and retrieve, responsive to receiving the first user session request, the first file from the base user profile. The server agent then just in time delivers the first file to the first user session. The server agent then receives a request from a second user session for the first file and a second file of the user profile, where the second user session and the first user session execute simultaneously. The server agent then identifies, responsive to receiving the second user session request, a modified version of the first file in the provisional user profile, and retrieves, responsive to identifying the modified first file in the provisional user profile, the modified first file from the provisional user profile and the second file from the base user profile. The server agent then just in time delivers the modified first file and the second file to the second user session.

In another aspect, described herein is a method for just in time delivery of a consistent user profile to overlapping user sessions. A server agent executing on a computer receives a request from a first user session for a first file of a user profile of a user. In response, the server agent delivers the first file from a base profile to the first user session. The server agent then receives a request from a second user session for the first file, where the second user session and the first user session execute simultaneously. Responsive to the request, the server agent delivers the first file from the base user profile to the second user session. Upon detecting that the first session ended, the server agent stores a modified version of the first file in a provisional user profile. The first file, in some instances, was modified by the first user session. The server agent then determines that a third user session started, where the third user session and the second user session execute simultaneously. Responsive to this determination, the server agent delivers the modified first file from the provisional user profile to the third user session.

In some embodiments, the modified first file is received from the user session prior to storing the modified first file in the provisional user profile.

In other embodiments, the server agent can receive a request from a third user session for a second file, and can delivery just in time the second file from the base user profile to the third user session.

The server agent, in some embodiments, can determine the second user session and the third user session terminated. Responsive to this determination, the server agent can merge the provisional user profile with the base user profile and can remove substantially all profile information from the provisional user profile.

In one embodiment, the first user session, the second user session and the third user session are of the same user.

BRIEF DESCRIPTION OF THE DRAWINGS

The following figures depict certain illustrative embodiments of the methods and systems described herein, where like reference numerals refer to like elements. Each depicted embodiment is illustrative of these methods and systems and not limiting.

DETAILED DESCRIPTION

Figure 1A:
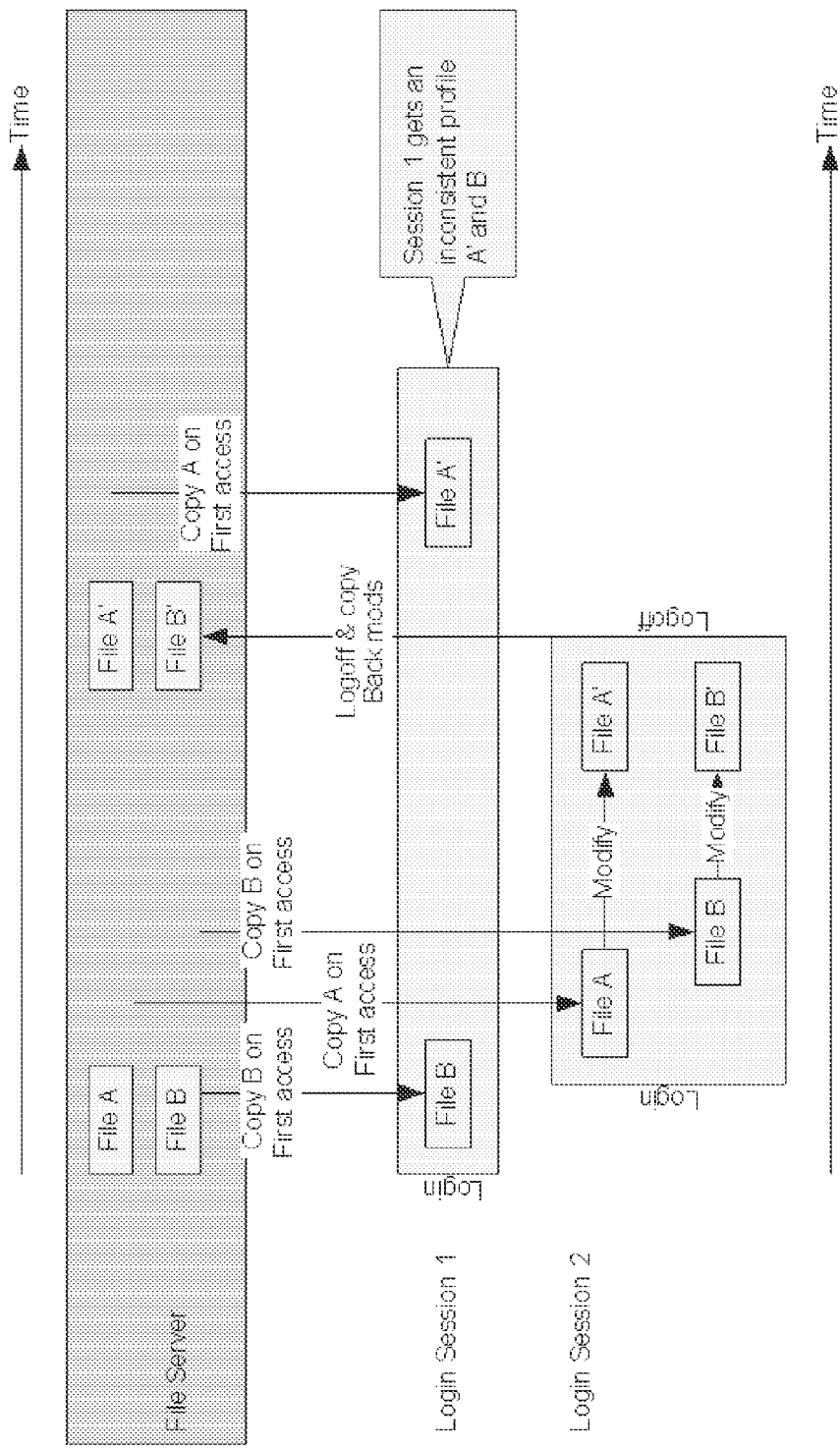
FIGS. 1A and 1B are block diagrams of embodiments of prior art systems.
Figure 1B:
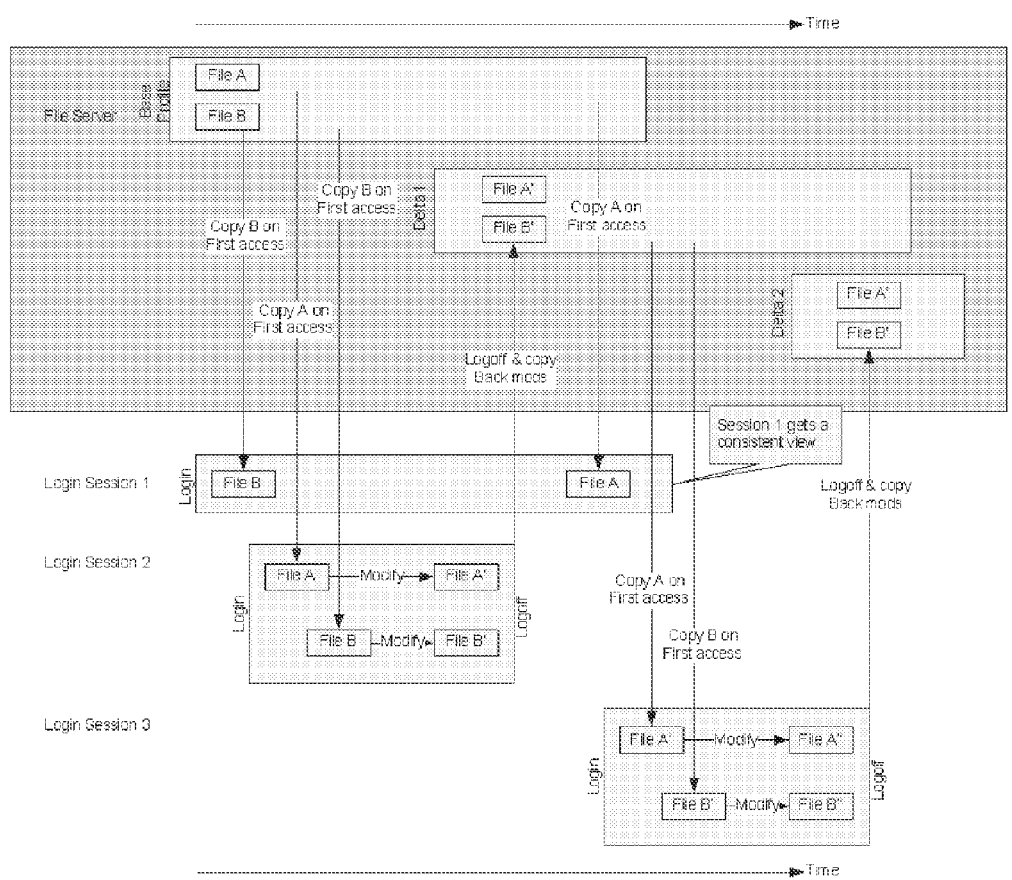
Figure 2A:
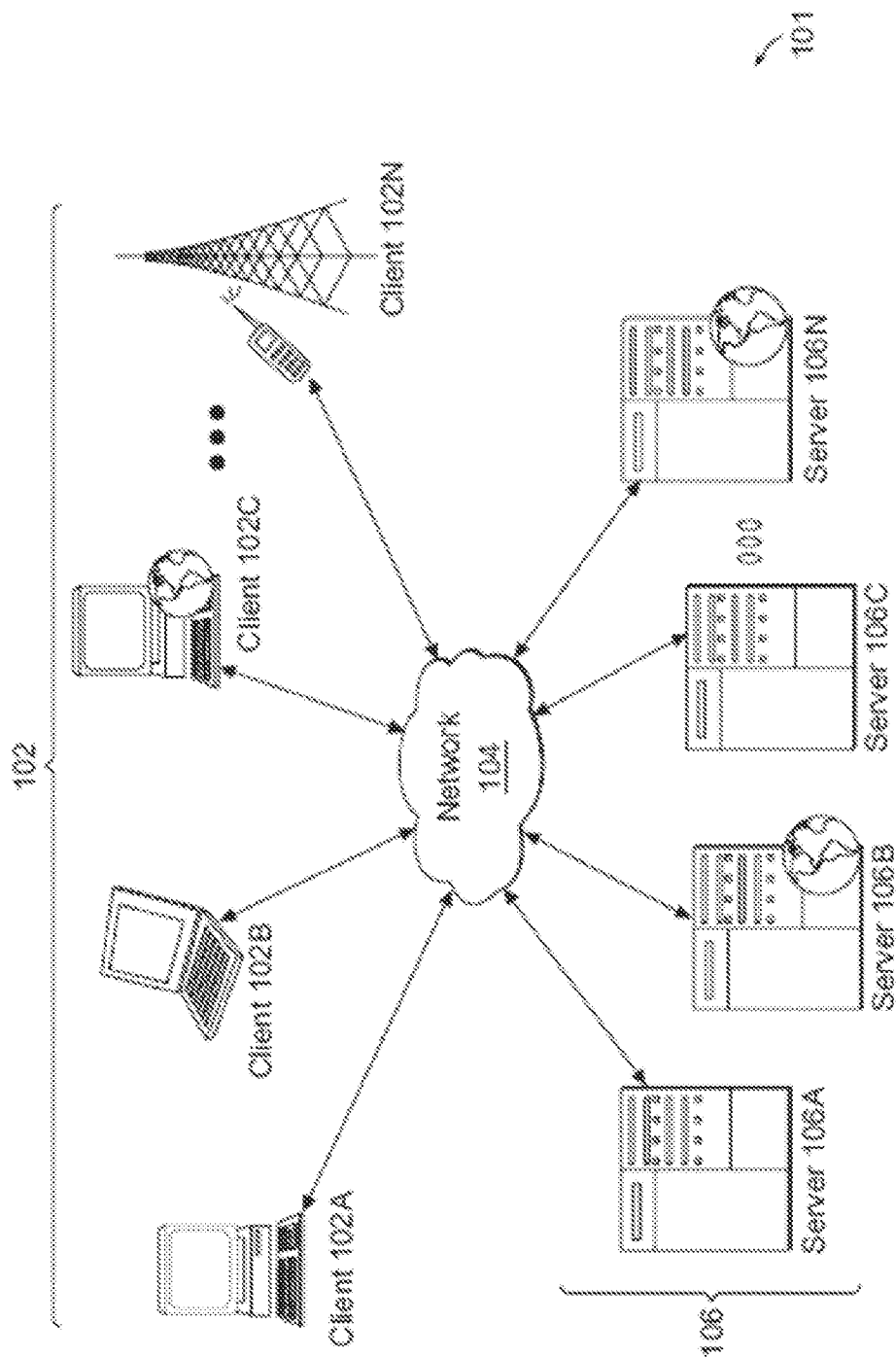
FIG. 2A is a block diagram illustrative of an embodiment of a remote-access, networked environment with a client machine that communicates with a server.

FIG. 2A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 2B:
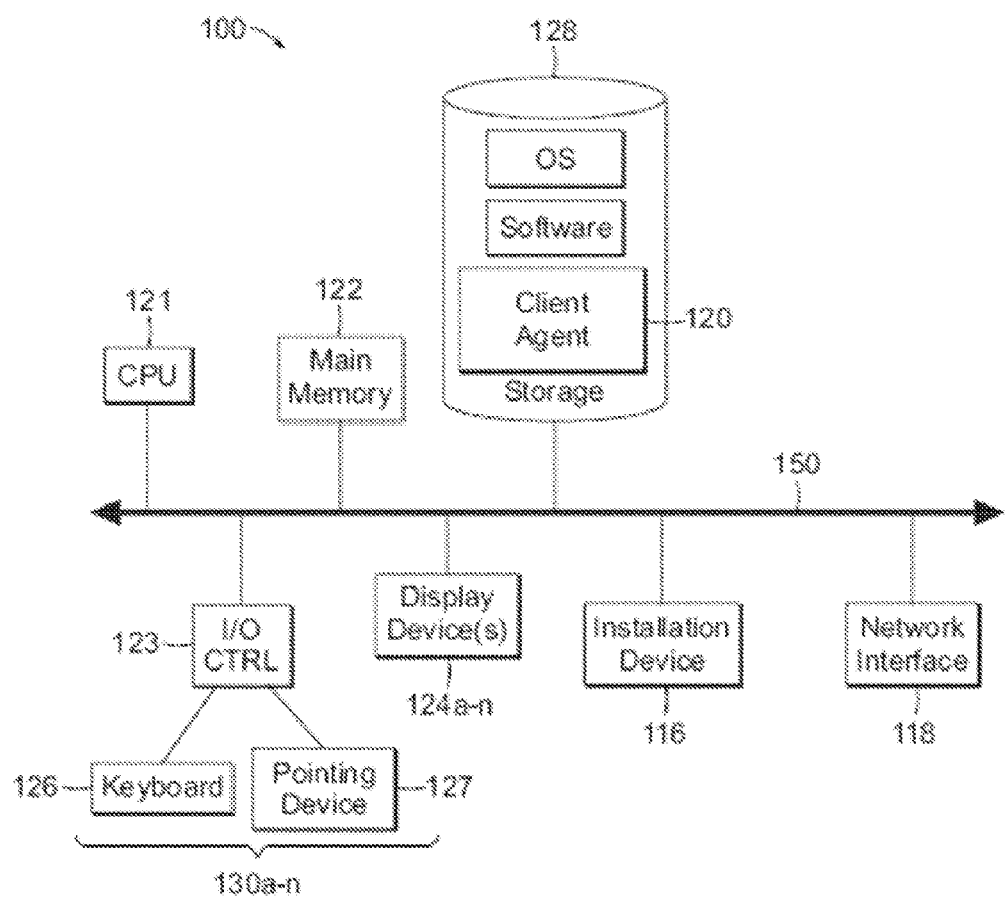
FIGS. 2B and 2C are block diagrams illustrative of an embodiment of computing machines for practicing the methods and systems described herein.

Illustrated in FIG. 2B is an embodiment of a computing device 100, where the client machine 102 and server 106 illustrated in FIG. 2A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 2C:
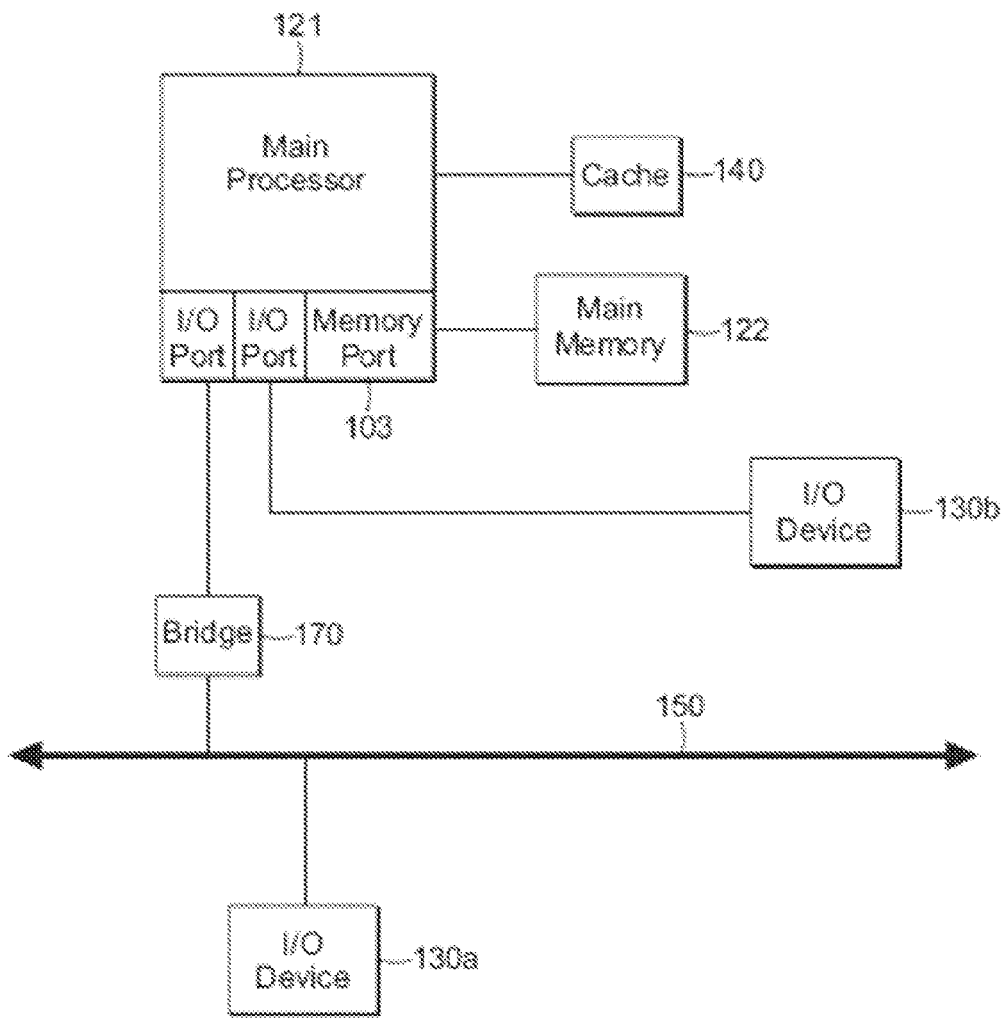

FIG. 2C illustrates one embodiment of a computing device 100, where the client machine 102 and server 106 illustrated in FIG. 2A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 2C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2D:
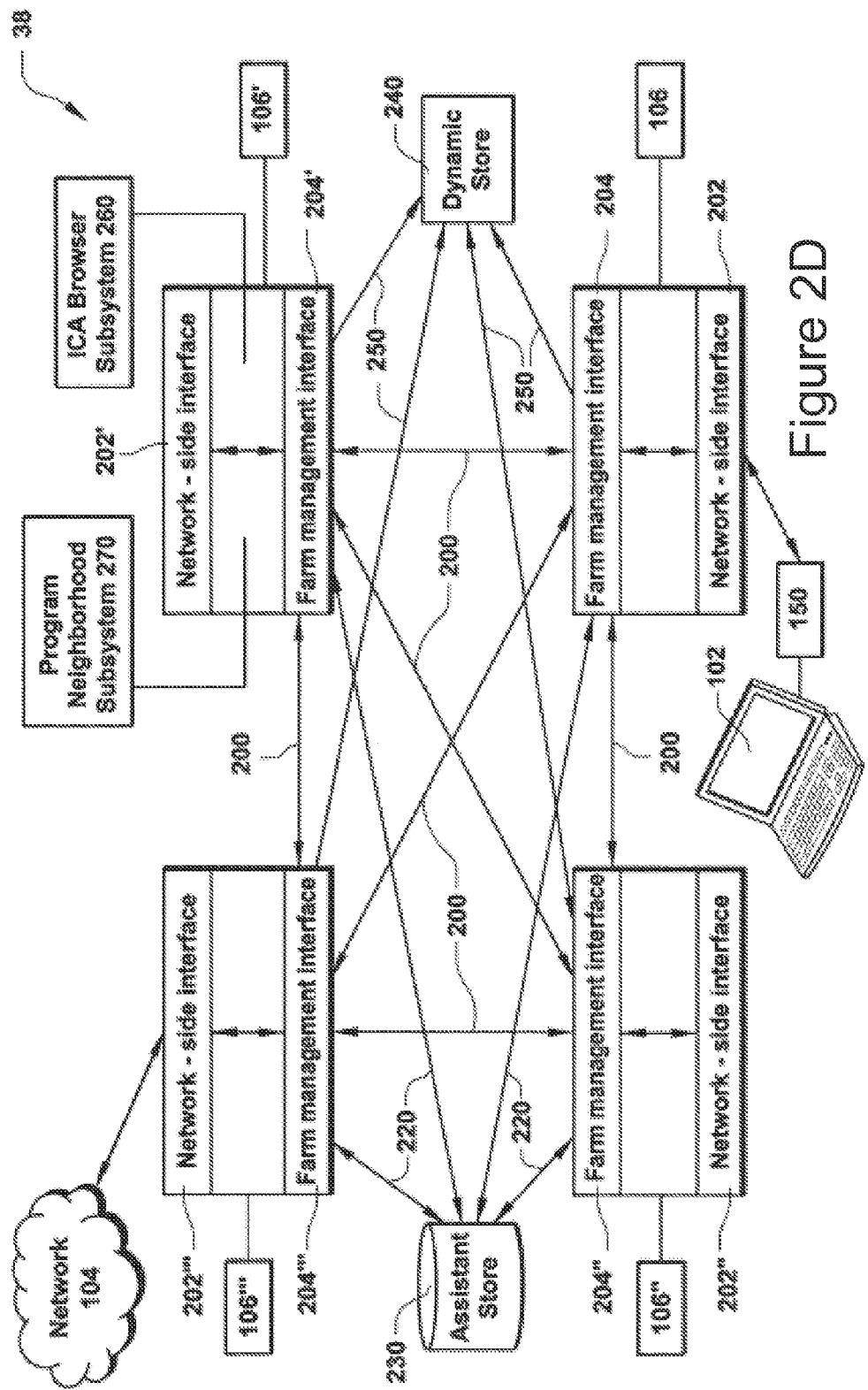
FIG. 2D is a block diagram depicting an embodiment of a server farm.

Referring now to FIG. 2D, together the servers 106 comprise a farm 38 or server farm, where each server 106 can include a network-side interface 202 and a farm-side interface 204. The network-side interface 202 can be in communication with one or more clients 102 or a network 104. The network 104 can be a WAN, LAN, or any other embodiment of a network such those networks described above.

Each server 106 has a farm-side interface 204 connected with one or more farm-side interface(s) 204 of other servers 106 in the farm 38. In one embodiment, each farm-side interface 204 is interconnected to other farm-side interfaces 204 such that the servers 106 within the farm 38 may communicate with one another. On each server 106, the farm-side interface 204 communicates with the network-side interface 202. The farm-side interfaces 204 can also communicate (designated by arrows 220) with a persistent store 230 and, in some embodiments, with a dynamic store 240. The combination of servers 106, the persistent store 230, and the dynamic store 240, when provided, are collectively referred to as a farm 38. In some embodiments, a server 106 communicates with the persistent store 230 and other servers 106' communicate with the server 106 to access information stored in the persistent store.

The persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 maintains static data associated with each server 106 in farm 38 and global data used by all servers 106 within the farm 38. In one embodiment, the persistent store 230 may maintain the server data in a Lightweight Directory Access Protocol (LDAP) data model. In other embodiments, the persistent store 230 stores server data in an ODBC-compliant database. For the purposes of this description, the term "static data" refers to data that do not change frequently, i.e., data that change only on an hourly, daily, or weekly basis, or data that never change. Each server uses a persistent storage subsystem to read data from and write data to the persistent store 230.

The data stored by the persistent store 230 may be replicated for reliability purposes physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

The dynamic store 240 (i.e., the collection of all record tables) can be embodied in various ways. In one embodiment, the dynamic store 240 is centralized; that is, all runtime data are stored in the memory of one server 106 in the farm 38. That server operates as a master network node with which all other servers 106 in the farm 38 communicate when seeking access to that runtime data. In another embodiment, each server 106 in the farm 38 keeps a full copy of the dynamic store 240. Here, each server 106 communicates with every other server 106 to keep its copy of the dynamic store 240 up to date.

In another embodiment, each server 106 maintains its own runtime data and communicates with other servers 106 when seeking to obtain runtime data from them. Thus, for example, a server 106 attempting to find an application program requested by the client 102 may communicate directly with every other server 106 in the farm 38 to find one or more servers hosting the requested application.

For farms 38 having a large number of servers 106, the network traffic produced by these embodiments can become heavy. One embodiment alleviates heavy network traffic by designating a subset of the servers 106 in a farm 38, typically two or more, as "collector points." Generally, a collector point is a server that collects run-time data. Each collector point stores runtime data collected from certain other servers 106 in the farm 38. Each server 106 in the farm 38 is capable of operating as, and consequently is capable of being designated as, a collector point. In one embodiment, each collector point stores a copy of the entire dynamic store 240. In another embodiment, each collector point stores a portion of the dynamic store 240, i.e., it maintains runtime data of a particular data type. The type of data stored by a server 106 may be predetermined according to one or more criteria. For example, servers 106 may store different types of data based on their boot order. Alternatively, the type of data stored by a server 106 may be configured by an administrator using an administration tool (Not Shown.) In these embodiments, the dynamic store 240 is distributed amongst two or more servers 106 in the farm 38.

Servers 106 not designated as collector points know the servers 106 in a farm 38 that are designated as collector points. A server 180 not designated as a collector point may communicate with a particular collector point when delivering and requesting runtime data. Consequently, collector points lighten network traffic because each server 106 in the farm 38 communicates with a single collector point server 106, rather than with every other server 106, when seeking to access the runtime data.

Each server 106 can operate as a collector point for more than one type of data. For example, server 106″ can operate as a collector point for licensing information and for loading information. In these embodiments, each collector point may amass a different type of run-time data. For example, to illustrate this case, the server 106‴ can collect licensing information, while the server 106″ collects loading information.

In some embodiments, each collector point stores data that is shared between all servers 106 in a farm 38. In these embodiments, each collector point of a particular type of data exchanges the data collected by that collector point with every other collector point for that type of data in the farm 38. Thus, upon completion of the exchange of such data, each collector point 106″ and 106 possesses the same data. Also in these embodiments, each collector point 106 and 106″ also keeps every other collector point abreast of any updates to the runtime data.

Browsing enables a client 102 to view farms 38, servers 106, and applications in the farms 38 and to access available information such as sessions throughout the farm 38. Each server 106 includes an ICA browsing subsystem 260 to provide the client 102 with browsing capability. After the client 102 establishes a connection with the ICA browser subsystem 260 of any of the servers 106, that browser subsystem supports a variety of client requests. Such client requests include: (1) enumerating names of servers in the farm, (2) enumerating names of applications published in the farm, (3) resolving a server name and/or application name to a server address that is useful the client 102. The ICA browser subsystem 260 also supports requests made by clients 10 running a program neighborhood application that provides the client 102, upon request, with a view of those applications within the farm 38 for which the user is authorized. The ICA browser subsystem 260 forwards all of the above-mentioned client requests to the appropriate subsystem in the server 106.

In one embodiment, each server 106 in the farm 38 that has a program neighborhood subsystem 270 can provide the user of a client 102 with a view of applications within the farm 38. The program neighborhood subsystem 270 may limit the view to those applications for which the user of the client 102 has authorization to access. Typically, this program neighborhood service presents the applications to the user as a list or a group of icons.

The functionality provided by the program neighborhood subsystem 270 can be available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 270 may occur over a dedicated virtual channel that is established on top of an ICA virtual channel. In other embodiments, the communication occurs using an XML service. In one of these embodiments, the program neighborhood-enabled client communicates with an XML subsystem, such as the XML service 516 described in connection with FIG. 6 below, providing program neighborhood functionality on a server 106.

In one embodiment, the program neighborhood-enabled client does not have a connection with the server with a program neighborhood subsystem 270. For this embodiment, the client 102 sends a request to the ICA browser subsystem 260 to establish an ICA connection to the server 106 in order to identify applications available to the client 102. The client 102 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete.

The program neighborhood subsystem 270 then requests the program neighborhood information from the common application subsystem 524 associated with those accounts. The common application subsystem 524 obtains the program neighborhood information from the persistent store 230. On receiving the program neighborhood information, the program neighborhood subsystem 270 formats and returns the program neighborhood information to the client over the program neighborhood virtual channel. Then the partial ICA connection is closed.

For another example in which the program neighborhood-enabled client establishes a partial ICA connection with a server, consider the user of the client 102 who selects a farm 38. The selection of the farm 38 sends a request from the client 102 to the ICA browser subsystem 260 to establish an ICA connection with one of the servers 106 in the selected farm 38. The ICA browser subsystem 260 sends the request to the program neighborhood subsystem 270, which selects a server 106 in the farm 38. Address information associated with the server 106 is identified and returned to the client 102 by way of the ICA browser subsystem 260. The client 102 can then subsequently connect to the server 106 corresponding to the received address information.

In another embodiment, the program neighborhood-enabled client 102 establishes an ICA connection upon which the program neighborhood-virtual channel is established and remains open for as long as the ICA connection persists. Over this program neighborhood virtual channel, the program neighborhood subsystem 270 pushes program neighborhood information updates to the client 102. To obtain updates, the program neighborhood subsystem 270 subscribes to events from the common application subsystem 524 to allow the program neighborhood subsystem 270 to detect changes to published applications.

Figure 2E:
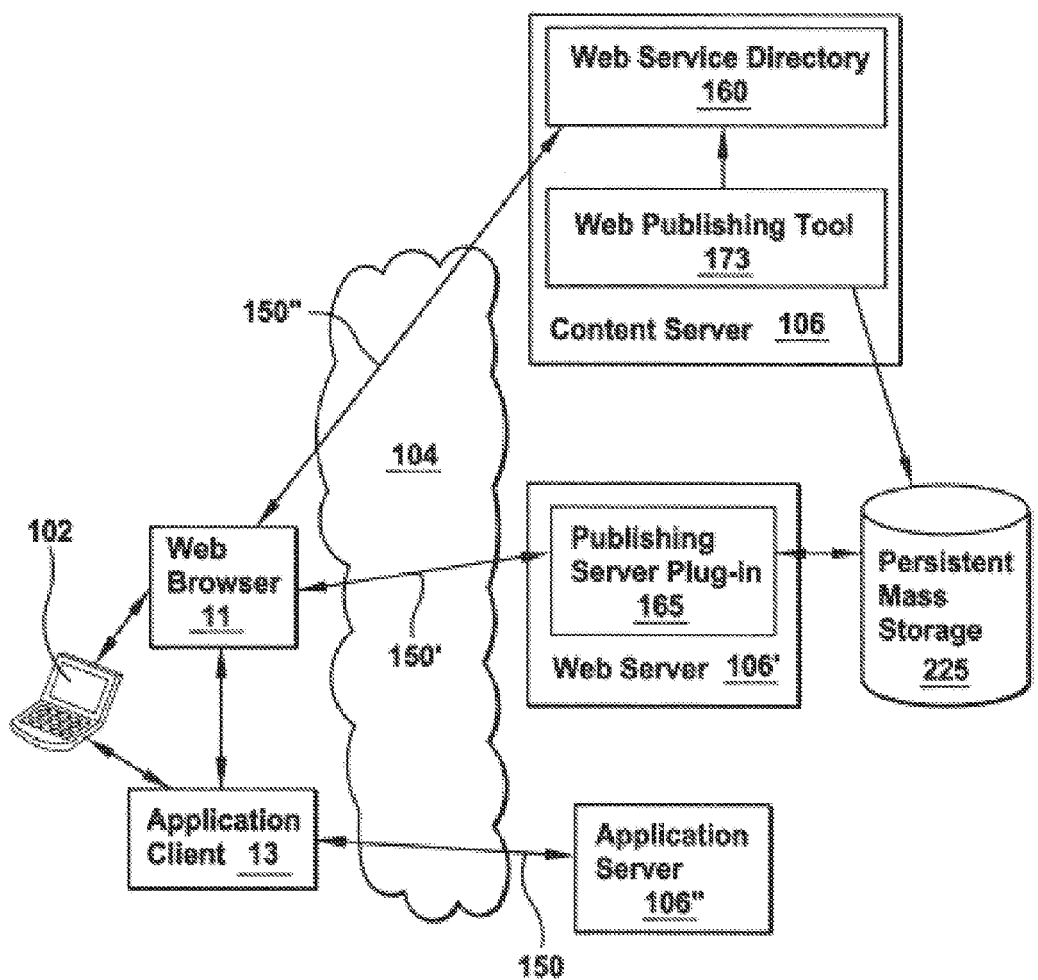
FIG. 2E is a block diagram depicting one embodiment of a system for providing a plurality of application programs available to the client via publishing of GUIs in a web service directory.

Referring to FIG. 2E, a block diagram depicts another embodiment of a system architecture for providing a plurality of application programs available to the client via publishing of GUIs in a web service directory. The system includes the client 102, and a plurality of servers 106. A first server 106 functions as a content server. A second server 106' provides web server functionality, and a third server 106" provides functionality for providing access to application files and acts as an application server or a file server. The client 102 can download content from the content server 106, the web server 106', and the application server 106" over the network 104. In one embodiment, the client 102 can download content (e.g., an application) from the application server 106" over the client-application server communication channel 150.

In one embodiment, the web browser 11 on the client 102 uses Secure Socket Layer (SSL) support for communications to the content server 106 and/or the web server 106'. SSL is a secure protocol developed by Netscape Communication Corporation of Mountain View, Calif., and is now a standard promulgated by the Internet Engineering Task Force (IETF). The web browser 11 can alternatively connect to the content server 106 and/or the web server 106' using other security protocols, such as, but not limited to, Secure Hypertext Transfer Protocol (SHTTP) developed by Terisa Systems of Los Altos, Calif., HTTP over SSL (HTTPS), Private Communication Technology (PCT) developed by Microsoft Corporation of Redmond, Wash., and the Transport Level Security (TLS) standard promulgated by the IETF. In other embodiments, the web browser 11 communicates with the servers 106 using a communications protocol without encryption, such as the HyperText Transfer Protocol (HTTP).

The client 102 can additionally include an application client 13 for establishing and exchanging communications with the application server 106" over the client-application server communication channel 150. In one embodiment, the application client 13 is a GUI application. In some embodiments, the application client 13 is an Independent Computing Architecture (ICA) client, developed by Citrix Systems, Inc. of Fort Lauderdale, Fla., and is also referred to below as ICA client 13. Other embodiments of the application client 13 include a Remote Display Protocol (RDP) client, developed by Microsoft Corporation of Redmond, Wash., an X-Windows client 13, a client-side player, interpreter or simulator capable of executing multimedia applications, email, Java, or .NET code. Moreover, in one embodiment the output of an application executing on the application server 106" can be displayed at the client 102 via the ICA client 13. In some embodiments, the application client 13 is an application client such as the application streaming client 552, described in greater detail in connection with FIG. 5.

The client 102 searches the web service directory 160 for a web service. In one embodiment, the search is a manual search. Alternatively, the search is an automatic search. The web service directory 160 may also provide a service based view, such as white and yellow pages, to search for web services in the web service directory. In another embodiment, the web service directory 160 supports a hierarchical browsing based on a structured service name and service kind for GUI applications. In one embodiment, the web service directory 160 executes on a server independent of the content server 106, such as a directory server. In other embodiments, the web service directory 160 executes on multiple servers.

In some embodiments, the content server 106 enables the client 102 to select web services based on additional analysis or information by providing this information or analysis in the web service directory 160. Examples of service information that the web service directory 160 can list includes, but is not limited to, the name of the business offering the service, the service type, a textual description of the service, one or more service access points (SAPs), the network type, the path to use (e.g., TCP or HTTPS), and quality of service (QoS) information. Moreover, service information can be client device type or user (e.g., role) specific. Thus, service selection can be based on one or more of the above attributes.

In one embodiment, the service type denotes a programming interface that the client 102 must use to access the web service. For instance, the service type can state that the service is encoded by an interface description language, such as Web Services Description Language (WSDL).

The service access point, or SAP, is a unique address for an application. The SAPs enable the computer system to support multiple applications at the client 102 and each server 106. For example, the application server 106" may support an electronic mail (i.e., e-mail) application, a file transfer application, and/or a GUI application. In one embodiment, these applications would each have a SAP that is unique within the application server 106". In one embodiment, the SAP is a web or Internet address (e.g., Domain Name System (DNS) name, IP/port, or Uniform Resource Locator (URL)). Thus, in one embodiment the SAP identifies the address of the web server 106' as part of the address for an application stored on the web server 106'. In some embodiments, the SAP identifies the address of a publishing server plug-in 165 as part of the address for an application stored on the web server 106', as described below. In one embodiment, the SAP is an "accessPoint" from the UDDI registry.

To prepare an item for publishing in the web service directory 160, the content server 106 includes a web publishing tool 170. In one embodiment, the web publishing tool 173 is a software module. Alternatively, the web publishing tool 173 is another server that may be externally located from or internally located in the content server 106.

In one embodiment, the web server 106' delivers web pages to the client 102. The web server 106' can be any server 106 capable of providing web pages to the client 102. In another embodiment, the web server 106' is an Enterprise Information Portal (e.g., corporate Intranet or secured business-to-business extranet). Enterprise portals are company web sites that aggregate, personalize and serve applications, data and content to users, while offering management tools for organizing and using information more efficiently. In some companies, portals have replaced traditional desktop software with browser-based access to a virtual workplace.

The web server 106' can also include a publishing server plug-in 165 to enable the publishing of graphical user interface (GUI) applications. More specifically, the publishing server plug-in 165 translates a new web service entry URL into a GUI application service so that the GUI can be accessed via the web service directory 160. In one embodiment, the publishing server plug-in 165 is a Common Gateway Interface (CGI) script, which is a program designed to accept and return data that conforms to the CGI specification. The program can be written in any programming language, such as C, Perl, Java, or Visual Basic. In another embodiment, the publishing server plug-in 165 is a Java Server Page (JSP). Using the publishing server plug-in 165 to facilitate the publishing of remote GUI applications, the client 102 can thereby access the web service, not through a programming interface or a web page, but through a full GUI interface, such as with Citrix's ICA or Microsoft's RDP.

The application server 106" hosts one or more applications that are available for the client 102. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, or application set managers.

In some embodiments, one or more communication links 150 are established over different networks. For example, the client-content server communication channel 150' can belong to a first network (e.g., the World Wide Web) and the client-web server communication channel 150" can belong to a second network (e.g., a secured extranet or Virtual Private Network (VPN)).

In one embodiment, the web publishing tool 173 stores information about an application that the web publishing tool 173 is currently publishing in the web service directory 160 in a persistent mass storage 225. In one embodiment the information is a URL for the dynamic publishing server plug-in 165. The persistent mass storage 225 may be a magnetic disk or magneto-optical drive. In one embodiment, the persistent mass storage 225 is a database server, which stores data related to the published application in one or more local service databases. The persistent mass storage 225 may be a component internally located in or externally located from any or all of the servers 106.

In other embodiments, the content server 106 or the web server 106' communicate with a server 106 in the farm 38 to retrieve the list of applications. In one of these embodiments, the content server 106 or the web server 106' communicate with the farm 38 instead of with the persistent mass storage 225.

Figure 3:
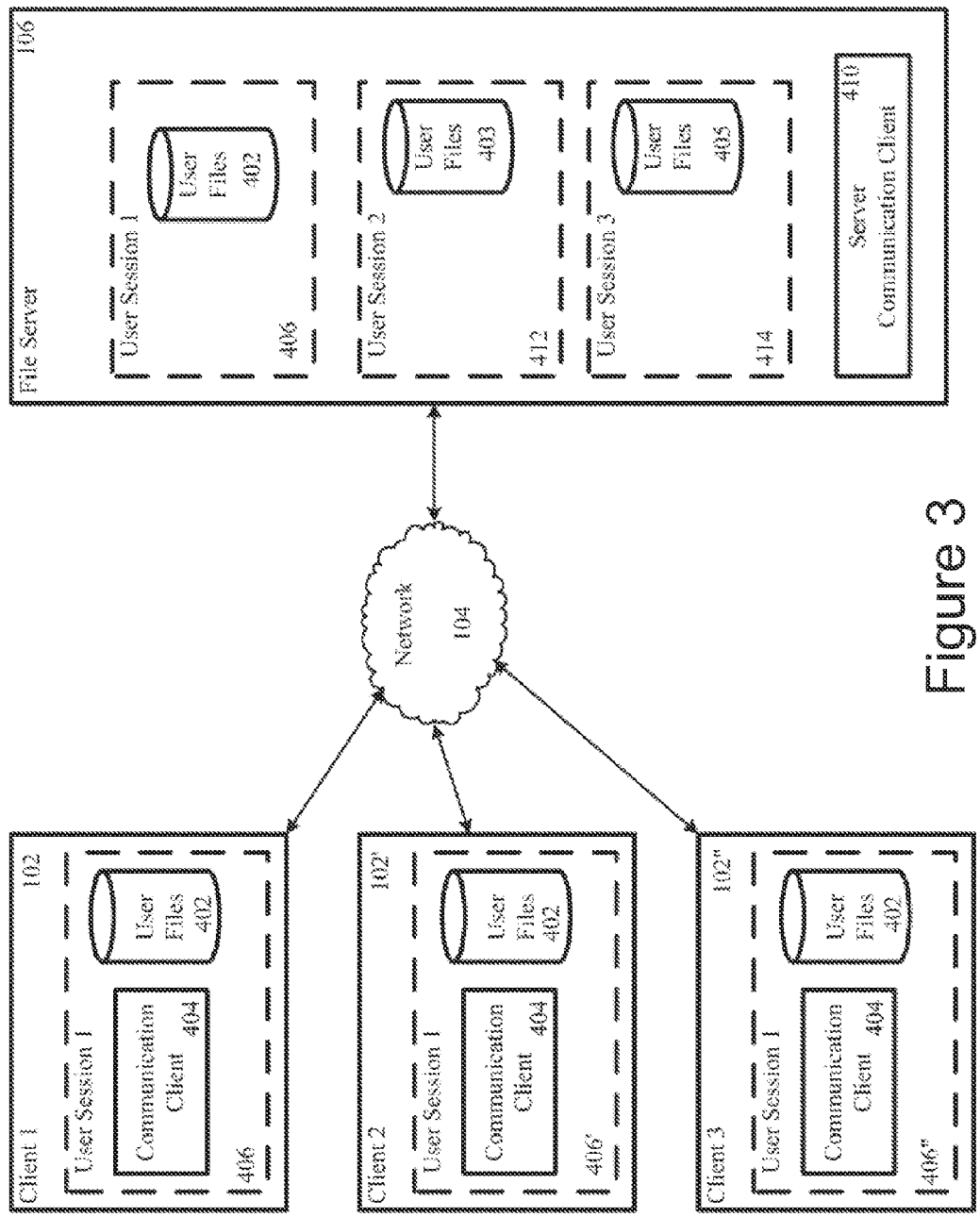
FIG. 3 is a block diagram of a system for streaming files to a user during a user session.

Illustrated in FIG. 3 is one embodiment of a system that includes a file server 106 that can maintain multiple user profiles for multiple users. The file server 106 can host any number of user sessions where each user session 406, 412, 414 corresponds to a user. Each user session can store user data such as user files 402, 403, 405, where together the user data may be referred to as a user profile. Executing on the server 106 can be a server communication client 410 that facilitates communication between the file server 106 and clients 102, 102', 102" (generally referred to as clients 102) over a network 104. The server communication client 410 can communicate with any number of components on the clients 102 and can in some embodiments communicate with a communication client 404 executing on the clients 102. Each client 102, 102', 102" can be accessed by a user and can host a user session 406, 406', 406" (generally referred to as user session 406.) Each user session 406 can include files and data of the user or stored in the user's profile, and can execute a communication client 404.

Further referring to FIG. 3, and in more detail, in some embodiments the clients 102 can be any client 102 or any computer 100 described herein. Similarly, in other embodiments the file server 106 can be any server 106 or any computer described herein. The network 104 can be any network 104 described herein.

A user session 406, 412, 414 executing on the file server 106 can be a session established between a user and the file server 106. In other embodiments, the user session can be a period of time during which a user is permitted to access the file server 106, a time period during which the user accesses the file server 106, or a period of time during which the user is authenticated to the file server 106. During this period of time, the user may have access to files, applications, settings and data available to or assigned to the user. In some embodiments, the files, applications, settings and data available to the user are referred to as the user profile. Illustrated in FIG. 3 are three user sessions 406, 412, 414 that in some embodiments, are associated with three different users. For example, user session 1 406 may be associated with user 1, while user session 2 412 may be associated with user 2, and user session 3 414 may be associated with user 3. In other embodiments, two or more user sessions can be associated with a single user. For example, user session 1 406 and user session 2 412 can be associated with user 1.

In some embodiments, a user session can be established by a user of a client 102. In these embodiments a user of the client computer 102 can initiate the creation of a connection between the client 102 and the file server 106 by requesting a file, data or access to files, data or applications executing on the file server 106 or on a server communicating with the file server 106. Upon establishing a connection with the file server 106, a user session is created. This user session can, in some embodiments, represent the period of time during which the user accesses information on or available to the file server 106.

The user sessions 406, 406', 406" of the clients 102 can be a client-side 102 representation of the time during which a user of a client computer 102 accesses information on or accessible to the file server 106. Just as any number of individual user sessions can execute on either a client 102 or the file server 106, so also any number of instances of a particular user session can execute on either a client 102 or the file server 106. For example, FIG. 3 illustrates an embodiment where an instance of user session 1 406, 406', 406" that executes on each of the three client computers 102. In another embodiment, each client 102 could execute a different user session, e.g. user session 1 406, user session 2 412, and user session 3 414.

In some embodiments, each user session can correspond to a unique user such that user session 1 406 corresponds to user 1 and user session 2 412 corresponds to user 2. In other embodiments, each user session can correspond to one or more users such that user session 1 406 corresponds to user 1 and user session 2 412 corresponds to user 1. In still other embodiments, each user session can correspond to a unique user while multiple instances of a user session can correspond to a single user. For example, user session 1 406 corresponds to user 1 and user session 2 412 corresponds to user 2; however a first instance of user session 1 406 and a second instance of user session 1 406' can correspond to a single user 1.

In some embodiments, one or more user sessions or user session instances that correspond to a single user, e.g. user 1, may overlap such that at any point in time the user session or login sessions are concurrent. In this embodiment a user can be logged into or accessing the file server 106 via a first user session 406 and a second user session 412. In another aspect, the user can be logged into or accessing the file server 106 via a first instance of a user session 406 and a second instance of a user session 406'. In each aspect, the user accesses or is logged into the file server 106 via two concurrent, simultaneous and overlapping user sessions. The user sessions are concurrent and simultaneous because they persist and exist during a same period of time. In these embodiments, the user can access an instance of the user profile via any one of the user sessions.

In some embodiments, a user can establish a user session using a communication client 404 executing on a client 102. In one embodiment, the communication client 404 can execute within the user session 406, while in other embodiments the communication client 404 can execute outside of the user session 406 and on the client computer 102. In some embodiments, when a user issues, via the client computer 102, a request for access to a file, information or an application on a remote server, the communication client 404 can facilitate the creation of a communication connection or virtual channel between the client 102 and the server. Facilitating the communication connection can include authenticating the user to the server, generating a session token, or otherwise establishing the user session and/or the virtual channel between the client computer 102 and the server.

In one embodiment each user session hosted on the file server 106 can include or correspond to one or more user files 402, 403, 405. These user files 402, 403, 405 can be referred to as a user profile. In some embodiments, the user profile can include files, data, settings, configurations, applications, or any other similar information. This information can be information that the user is permitted to access or modify, while in other embodiments the information can be specific to the user such that they are user-specific settings or user-created files. In other embodiments, the information can be information assigned to the user, e.g. a public folder or application. Generally, the user profile can be a set of characteristics and information specific to a particular user. For example, the user profile may contain: a shortcut to a my documents folder; a my documents folder; a set of links classified by the user as "favorites;" a set of links indicating a history of the user's web-browsing; a set of network share drives or printers; a desktop; a set of files used to configure a start menu; a user's personalized settings for the software included within the profile; a set of programs; data files; program files; configuration files; and any other data that can be used to set up an environment specific to a particular user.

FIG. 3 illustrates an embodiment where each user session corresponds to a unique user. In this embodiment, each set of user files or each user profile also corresponds to a unique user. In other embodiments, when one or more user sessions correspond to a single user, the user files or user profile available to that user session is the same set of user files for that particular, single user.

Figure 4:
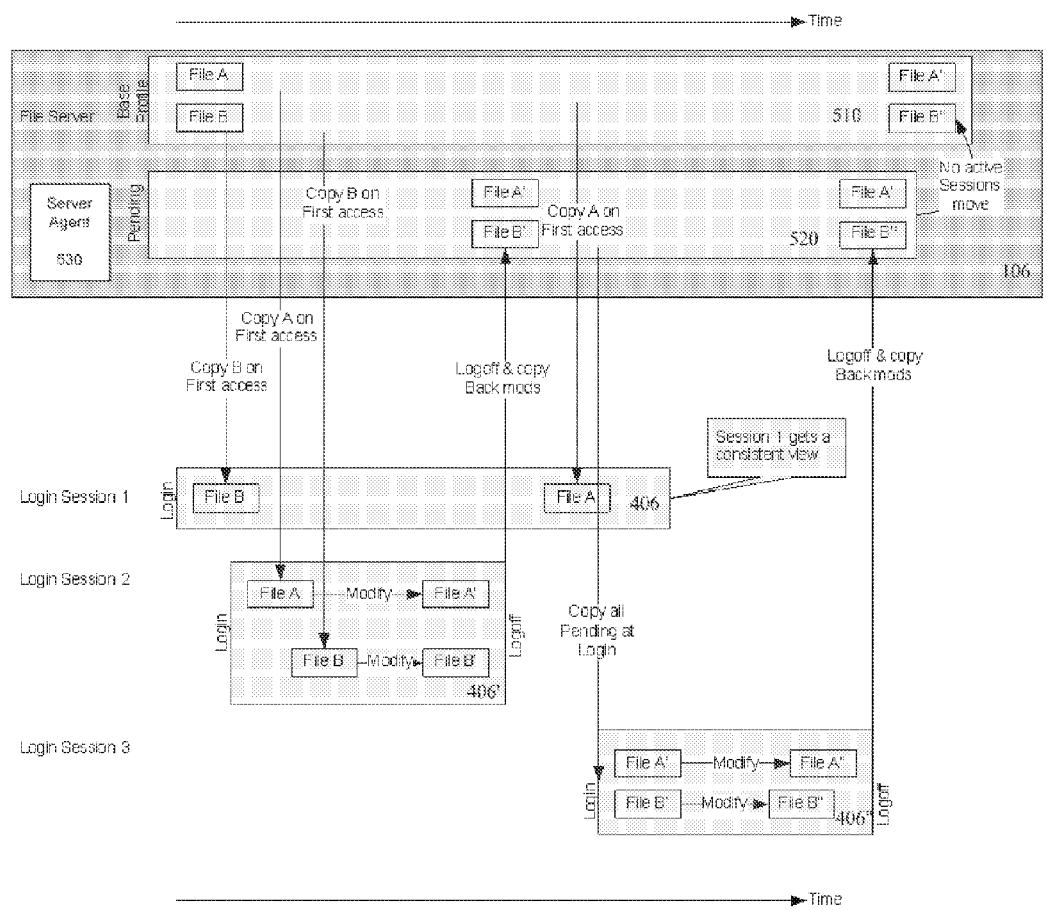
FIG. 4 is a block diagram of one embodiment of a system for mitigating profile inconsistencies.

Illustrated in FIG. 4 is an embodiment of a system for mitigating potential user profile inconsistencies caused when a user is provided with just-in-time delivery of profile contents, and when the user accesses the user profile via more than one client computing machine. In one embodiment, a user can access the user's profile on a file server 106 via a first user session 406, a second user session 406' or a third user session 406". The file server 106 can contain both a base user profile 510 and a provisional user profile 520. In one embodiment, when the user accesses files within the user's profile, the user can access files in either the base user profile 510 or the provisional user profile 520. A server agent 530 executing on the file server 106 can manage whether the user receives a requested file from the base user profile 510 or from the provisional user profile 520.

Further referring to FIG. 4 and in more detail, the file server 106 can be any embodiment of the servers 106 described herein. In some embodiments, the user can access the file server 106 via user sessions 406, 406', 406" on one or more client machines 102. Thus, in some embodiments the user may access the file server 106 via a user session 406 executing on a client computer 102, the user may access the file server 106 via the second user session 406', or a third user session 406". The file server 106, in some embodiments, can require no additional executable program code or applications to permit the file server 106 to deliver consistent user profiles just in time. Rather, an existing file server 106 with no additional features can be used to accomplish the just in time delivery described herein. In one embodiment, the user sessions may be referred to as login sessions. The user sessions can each execute on a separate client computer 102, while in other embodiments two or more user sessions can execute on the same client computer 102.

In some embodiments, each user session 406, 406', 406" (referred to generally as user session 406) can have a start time and end time. The start time, in some embodiments, can be the time when the user session begins and can be referred to as a login time. This start time can be when the user initiates a login procedure, the time when a user is authenticated to the file server 106, or the point in time when the virtual channel between the client 102 and the file server 106 is created. The end time, in some embodiments, can be the time when the user session ends and can be referred to as the logoff time. An end time can be the time when the user session ends, the time when the virtual channel between the client 102 and the file server 106 is destroyed, or another predetermined time. In some embodiments, the file server 106 can track the amount of idle time accumulated during each user session 406. When the amount of idle time reaches a predetermined threshold, the file server 106 may terminate the user session.

User sessions may overlap or execute concurrently such that the start time for one user session can occur after the start time for another user session but before the end time of that user session. In some embodiments, user sessions for the same user can overlap or execute concurrently. FIG. 4 illustrates three user sessions 406 of a single user. Although each of these user sessions 406 was initiated by the same user, they still execute concurrently. For example, a second user session 406' logon time is after the logon time of the first user session 406 but before the logoff time of the first user session 406. Additionally, the logon time for a third user session 406" may occur after the logoff time of the second user session 406' but before the logoff time of the first user session 406. Thus, at some point in time, the first user session and the second user session execute concurrently or simultaneously and the first user session and the third user session execute concurrently or simultaneously.

Included on the file server 106 is a base user profile 510 associated with the user. In one embodiment, the base user profile 510 includes the files associated with a particular user. The base user profile 510 can be considered in some instances the core or main user profile such that the base user profile 510 maintains a current and up-to-date copy of all the files in a user's profile. When a user profile or user files are created, in some embodiments the result is the base user profile 510. Further, when a user logs into the file server 106, the user accesses the base user profile 510. Like a user profile, the base user profile 510 can include user files, data, settings, configurations, applications, or any other similar information. In some embodiments, the base user profile 510 can be any user profile, while in other embodiments the base user profile 510 can be any user profile described herein. In still other embodiments, the base user profile 510 can be a version of a user's profile. For example, a user's profile can, in some embodiments, be the sum of all files, information, applications and settings of a user, including all deleted items, newly added items and modified items. Thus, in some embodiments, the user's profile can be the sum of the base user profile 510 and the provisional user profile 520. In these embodiments, the base user profile 510 can be a version of the user's profile because it includes the user's profile minus the delta information stored in the provisional user profile 520. Similarly, the provisional user profile 520 can be a version of a user's profile because it includes the delta information or changes made to a user's profile.

The file server 106 can further include a provisional user profile 520 which can also be called the pending user profile. The provisional user profile 520, in some embodiments, can store, track or manage temporary user files and data. A temporary file, in some embodiments, can be a file that is modified or that has attributes which are modified, or a newly created file. In some embodiments, the provisional user profile 520 can include applications newly assigned to or associated with the user. The provisional user profile 520 can also include modified or newly created configuration information or settings. Modification of a file, setting or information can include: changing the content of the information; deleting content from the file; adding content to the file; changing the location of the setting, file or information; renaming the file, setting or information; changing the permissions of the file or information; or in any way modifying the content or changing the attributes of the file, setting or information.

Temporary files stored in the provisional user profile 520 can correspond to files stored in the base user profile 510. For example, if a user modifies File A during the course of a first user session, the modified version of File A can be stored in the provisional user profile 520 until the first user session ends. In some embodiments, when the first user session ends, the server agent 530 replaces the version of File A in the base user profile 510 with the version of File A in the provisional user profile 520. Thus, a current and up-to-date version of File A is maintained in the base user profile 510. The provisional user profile 520 therefore stores modified or newly created files until all user sessions of a particular user end and the server agent 530 is able to update the base user profile 510 with the changes stored in the provisional user profile 520. In this sense, the provisional user profile 520 can be characterized as a storage repository for changes made to a user's profile or base user profile 510.

In some embodiments, when a user deletes a file from the base user profile 510, the server agent 530 searches the provisional user profile 520 for a version of the deleted file and deletes the file from the provisional user profile 520. In other embodiments, the server agent 530 tags the file in the provisional user profile 520 by including metadata or other information that indicates the file was deleted from the base user profile 510.

In some embodiments, the base user profile 510 can include a file directory that establishes a directory structure for locating the files in the user profile 510 and lists the names of the files within the base user profile 510. The file directory included in the base user profile 510 can, in some embodiments, be updated each time the server agent 530 determines that there are no pending or persisting user sessions for a user. Upon making this determination, the server agent 530 can update the base user profile 510 and the base user profile directory with the changes stored in the provisional user profile 520. In one embodiment, updating the base user profile directory can include comparing the base user profile file directory to a file directory in the provisional user profile 520 and updating the base user profile file directory with the changes. In other embodiments, the base user profile directory can be updated as changes are stored to the provisional user profile 520.

In some embodiments, the provisional user profile 520 can include a file directory. This directory can include indicators that track both the former and current name of a particular file. Thus in some embodiments, maintaining a currently name file can be accomplished by comparing the provisional user profile file directory with the base user profile file directory and updating the names of the files in the base user profile according to the comparison. In some embodiments, tracking file name changes can be accomplished using an agent executing in the provisional user profile 520. This agent can intercept file name change requests, store a copy of the request and use the request to change the file name when the user logs off. The movement of files from one location to another within the file directory can also be tracked by the provisional user profile 520 and the tracked changes can be used to update the file directory. In one embodiment, the changes made to the location of a file within the file directory are translated to the file directory in the base user profile 510 much the same way that the names of files within the base user profile 510 file directory are updated.

When a user requests access to the file directory of the base user profile 510, in some embodiments the server agent 530 can provide the user with access to the file directory of the provisional user profile 520. In other embodiments, the user can be provided with access to a modified file directory of the base user profile 510.

Communication between the base user profile 510 and the provisional user profile 520 can be brokered or facilitated by the server agent 530. In other embodiments, communication between the base user profile 510 and the provisional user profile 520 can be facilitated by a file management system on the file server 106.

In one embodiment, when a user logs on, the user session receives the entire contents of the provisional user profile 520. Those files not included within the provisional user profile are then retrieved from the base user profile 510 and transferred to the user session. Thus, at logon the user session is provided with an up-to-date and current version of the user profile. During logon and logoff, in some embodiments, a global single write/multiple reader lock can be used to ensure that the reads from the provisional user profile 520 are consistent. Using this lock can ensure that files are not modified during an initial read from the provisional user profile 520. When a user session logs off, substantially all file modifications can be written to the provisional user profile 520 and merged with other changes made during other login sessions. In one embodiment, after determining that no additional user sessions are active, the aggregate file changes are transferred to the base user profile and all changed files are substituted into the base user profile 510 in place of the previous version of the file. Thus, the entire base user profile 510 is updated with the file changes represented by the modified files within the provisional user profile 520. In one embodiment, the provisional user profile 520 is flushed and its contents are deleted after the changes are made to the base user profile 510.

In some embodiments, delivery of the files to the user session is "just-in-time," meaning that the files are streamed to the user sessions on an as-requested basis. Thus in one embodiment, the consistency of the user profile can be maintained by using a single or one provisional user profile 520 as a pending or intermediary profile for the user. The user therefore can in some embodiments have only two profiles, a single base user profile 510 and a single provisional user profile 520. Further, in some embodiments, the base user profile 510 does not include any functionality beyond acting as a file directory. In other embodiments, the provisional user profile 520 does not include any functionality beyond acting as a file directory. In either of the above-mentioned embodiments, the base user profile 510 and the provisional user profile 520 do not include code and do not execute code.

Figure 5:
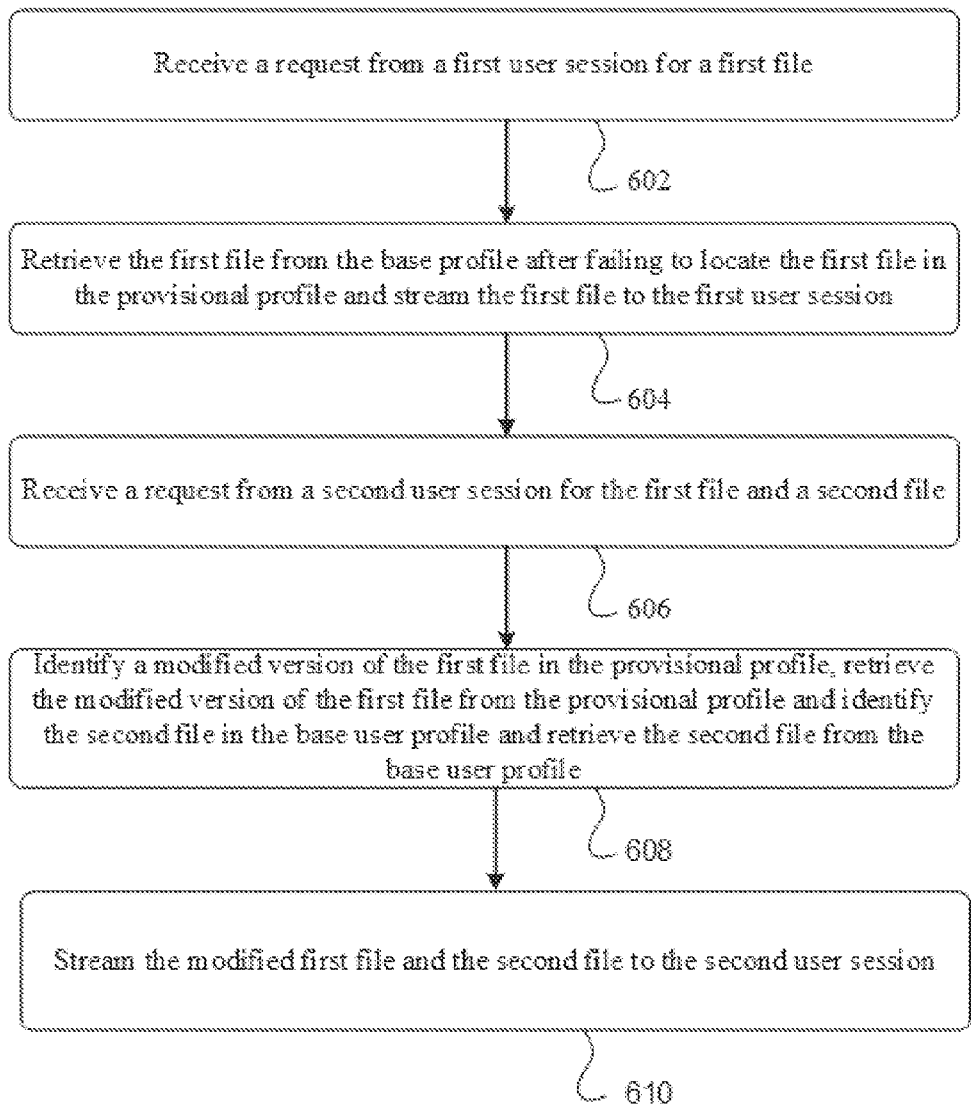
FIG. 5 is a flow diagram of one embodiment of a method for mitigating profile inconsistencies.

Illustrated in FIG. 5 is an embodiment of a method for mitigating user profile inconsistencies. The method includes a server agent 530 receiving a request from a first user session for a first file (Step 602). Upon receiving the request, the server agent 530 retrieves the first file from the base user profile 510 after failing to locate the first file within the provisional user profile 520, and streams the first file to the first user session (Step 604). After transmitting the first file to the first user session, the server agent 530 receives a request from a second user session for the first file and for a second file (Step 606). The server agent 530 searches the provisional user profile 520 and upon finding the first file in the provisional user profile 520 and the second file in the base user profile 510 (Step 608), the server agent 530 retrieves the first file and the second file and streams the first file and the second file to the second user session (Step 610).

Further referring to FIG. 5, and in more detail, the server agent 530 executing on the file server 106 can receive file access requests from any number of user sessions. In one embodiment, the server agent 530 receives or intercepts a request for a first file from the first user session (Step 602). The first user session, in some embodiments, can be of a user that has a user profile. In some embodiments, the request for the first file can be a request for a first file stored in a user profile of a user. The user can be the user that initiated or established the first user session. In one embodiment, the server agent 530 first searches the provisional user profile 520 for the first file and upon failing to locate the first file, retrieves the first file from the base user profile 510. In other embodiments, the server agent 530 fails to find a copy of the first file in the provisional user profile 520, and upon failing to find a copy of the file the server agent 530 retrieves the first file from the base user profile 510.

In one embodiment, the server agent 530 retrieves the first file from the base user profile 510 and streams the first file to the first user session (Step 604). In one embodiment, the server agent can retrieve the requested first file from the base user profile 510 in response to receiving or intercepting the request for the first file. In other embodiments, the first user session retrieves the first file from the base user profile 510 upon determining that the first file is not stored in the provisional user profile 520, or upon determining that the first file was not deleted from the base user profile 510 or the provisional user profile 520. In still other embodiments, the first user session retrieves the first file from the base user profile 510 upon failing to locate a version of the first file in the provisional user profile. The first user session, in some embodiments receives the first file and modifies the first file. In other embodiments, the first user session can: modify the content of the first file; delete the first file; modify the attributes of the first file (e.g. modify the file name or file location); or alter in any way the first file. When the first user session modifies the first file, the first user session writes the first file modifications to the provisional user profile 520 such that the provisional user profile 520 stores a modified version of the first file. Similarly, when the first user modifies attributes of the first file or deletes the first file, the server agent 530 or the first user session can note the changes and/or write the modifications to the provisional user profile 520.

The server agent 530, upon retrieving the requested first file, can deliver the retrieved first file to the first user session. In some embodiments, delivering the first file can include streaming the first file to a communication client executing on the client 102. In other embodiments, delivering the first file can include streaming the first file to the client computer 102. The server agent 530, in some embodiments, can deliver the first file just in time. Just in time delivery can include delivering the first file substantially immediately after the file is requested by the user. Just in time delivery can be accomplished by transmitting the requested file directly to the user without performing additional computations or actions.

Upon receiving a request from a second user session for the first file and a second file of the user profile (Step 606), the server agent 530 searches or queries the provisional user profile 520 for the first file. In embodiments where the first user session modified the first file and wrote the modifications to the provisional user profile 520, the server agent 530 can locate that modified first file in the provisional user profile 520. The server agent can further search or query the provisional user profile 520 for the requested second file. Upon failing to find the second file in the provisional user profile 520, the server agent 530 can search the base user profile 510 for the requested second file. In some embodiments, when the server agent 530 identifies a file in either the base user profile 510 or the provisional user profile 520, the server agent 530 can retrieve the file. Thus, in each of the above cases, the server agent 530 can retrieve the first file from the provisional user profile 520, and the second file from the base user profile 510. In other embodiments, the server agent 530 can retrieve the files from the base user profile 510 and the provisional user profile 520 in response to identifying the modified first file in the provisional user profile 520 and identifying the second file in the base user profile 510 and not in the provisional user profile 520.

In some embodiments, a user of the first user session can initiate a modification of the first file before the server agent searches for the modified first file in the provisional user profile 520 (Step 608). This modification can be any modification or deletion operation described herein. In some embodiments, the first user session can cause a modification of the first file to occur, where this modification is written to the provisional user profile 520. After the modification is written to or stored in the provisional user profile 520, the server agent 530 can identify the modified first file in the provisional user profile 520.

In one embodiment, the server agent 530 can receive a request for the first file and a second file from a second user session that executes at the same time as the first user session. Thus, in this embodiment, the first user session and second user session, at the time the request for the files is made, execute simultaneously. In some instances, simultaneously can refer to two user sessions that overlap such that one user session executes at the same time as the other user session. Thus, the first user session and the second user session execute concurrently such that their pendency overlap. In some embodiments, the first user session can be a user session of a user, while the second user session can be a user session of the same user. Thus, the user is accessing the user's profiles via both a first user session and a second user session.

The server agent 530, upon retrieving the first file and the second file can deliver or transmit both files to the second user session (Step 610). In some embodiments, delivering or transmitting both files can include streaming the first file and the second file to the second user session. In other embodiments, delivering or transmitting both files can include just in time delivery or streaming of the first file and the second file to the second user session.

In one embodiment of the methods and systems described herein, when a user logs onto the file server 106, the entire contents of the provisional user profile 520 are copied onto the client machine 102 used by the user to log onto the file server 106. When, in some embodiments, the number of user sessions associated with a particular user approaches or reaches zero (i.e. there are no active user sessions associated with the user,) the entire provisional user profile 520 can be flushed such that no file copies exist in the provisional user profile 520. When, in some embodiments, the user logs onto the file server 106 within a user session different from the first user session, the entire contents of the provisional user profile 520, as they exist at that point in time, are copied onto the client machine 102 used by the user to log onto the file server 106. In some embodiments, the user does not receive or retrieve file copies from the provisional user profile 520 during runtime. Rather, in this embodiment the user receives file copies from the provisional user profile 520 when the user initially logs onto the file server 106. If the same user logs into the file server 106 multiple times such that there exist multiple concurrent user sessions associated with the same user, then each time the user logs in the user can receive file copies from the provisional user profile 520.

Figure 6:
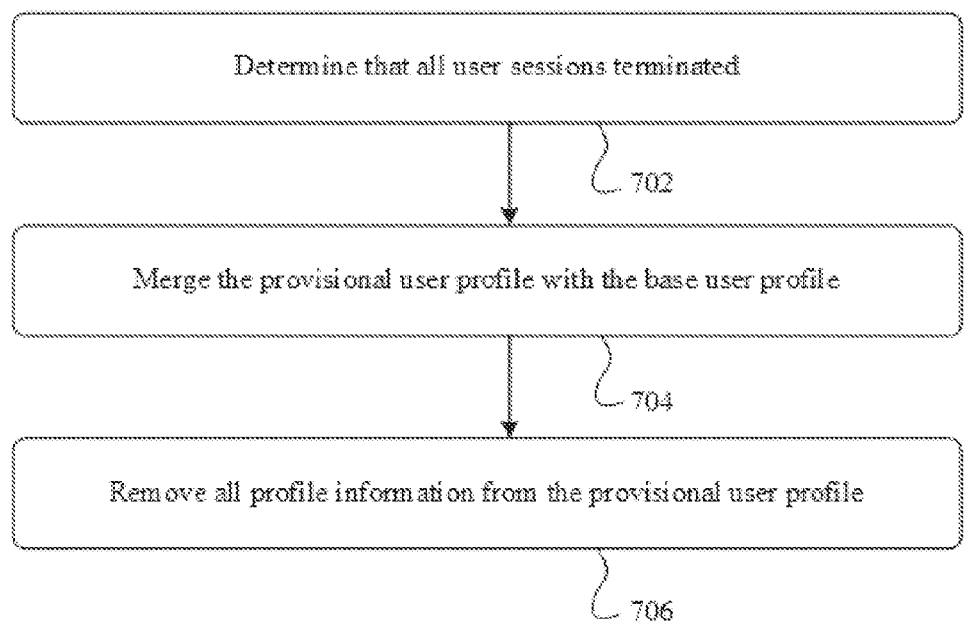
FIG. 6 is a flow diagram of one embodiment of merging a base user profile and a provisional user profile.

Illustrated in FIG. 6 is one embodiment of a method for merging a provisional user profile 520 with a base user profile 610. A server agent 530 can determine that all user sessions of a user terminate (Step 702). Upon making this determination, the server agent 530 can merge the provisional user profile 520 of the user with the base user profile 510 of the user (Step 704). The server agent 530 can then remove all profile information from the provisional user profile 520 of the user (Step 706).

Further referring to FIG. 6, and in more detail, in one embodiment the server agent 530 can determine that all user sessions of a user have been terminated (Step 702). In some embodiments, making this determination can include monitoring a listing of the persistent, active user sessions, and determining that for a particular user, no user sessions are active. In other embodiments, a manager, agent or other program executing on the server 106 to establish and manage user sessions, can issue a notification to the server agent 530 each time a user session is established and/or terminated. Thus, the server agent 530 can maintain a list of user sessions associated with a user and whether the user session is active. When a particular user no longer has active user sessions associated with it, the server agent 530 can initiate a merge of the provisional user profile 520 and the base user profile 510. In another embodiment, the server agent 530 can intercept notices that indicate either a user session started or terminated.

In some embodiments, the server agent 530 can determine that all user sessions associated with a single user terminated. In other embodiments, the server agent 530 can determine that all instances of a user session associated with a single user terminated. For example, if a first user session and a second user session are associated with a single user, the server agent 530 can determine that all user sessions terminated when the server agent 530 determines that the first user session and the second user session terminated.

Upon determining that all user sessions or user session instances of a single user terminated, the server agent can merge the provisional user profile 520 of the user with the base user profile of the user (Step 704). In some instances, merging can include identifying the user information or files that reside in both the provisional user profile 520 and the base user profile 510 and replacing the files in the base user profile 510 with the files in the provisional user profile 520. Thus, the modified, added, deleted and otherwise changed files stored in the provisional user profile 520 are used to update the corresponding files in the base user profile 510. Merging can also include identifying those files in the provisional user profile 520 that are not stored in the base user profile 510, e.g. newly added files, and copying the newly added files into the base user profile 510. Merging can further include comparing a provisional file directory of the provisional user profile 520 with a base file directory of the base user profile 510. Upon comparing the two file directories, a listing of all the changes made to files paths and file names can be compiled, e.g. the changes are tracked during the comparison. The file paths and file names of the file directory of the base user profile 510 can then be updated according to the changes stored in the provisional file director and according to the changes tracked during the comparison.

In some instances, after the two user profiles are merged, all user profile information in the provisional user profile 520 can be deleted or removed (Step 706). In other embodiments, the information can stay in the provisional user profile 520, but may be overwritten the next time a user session of the user starts.

Figure 7:
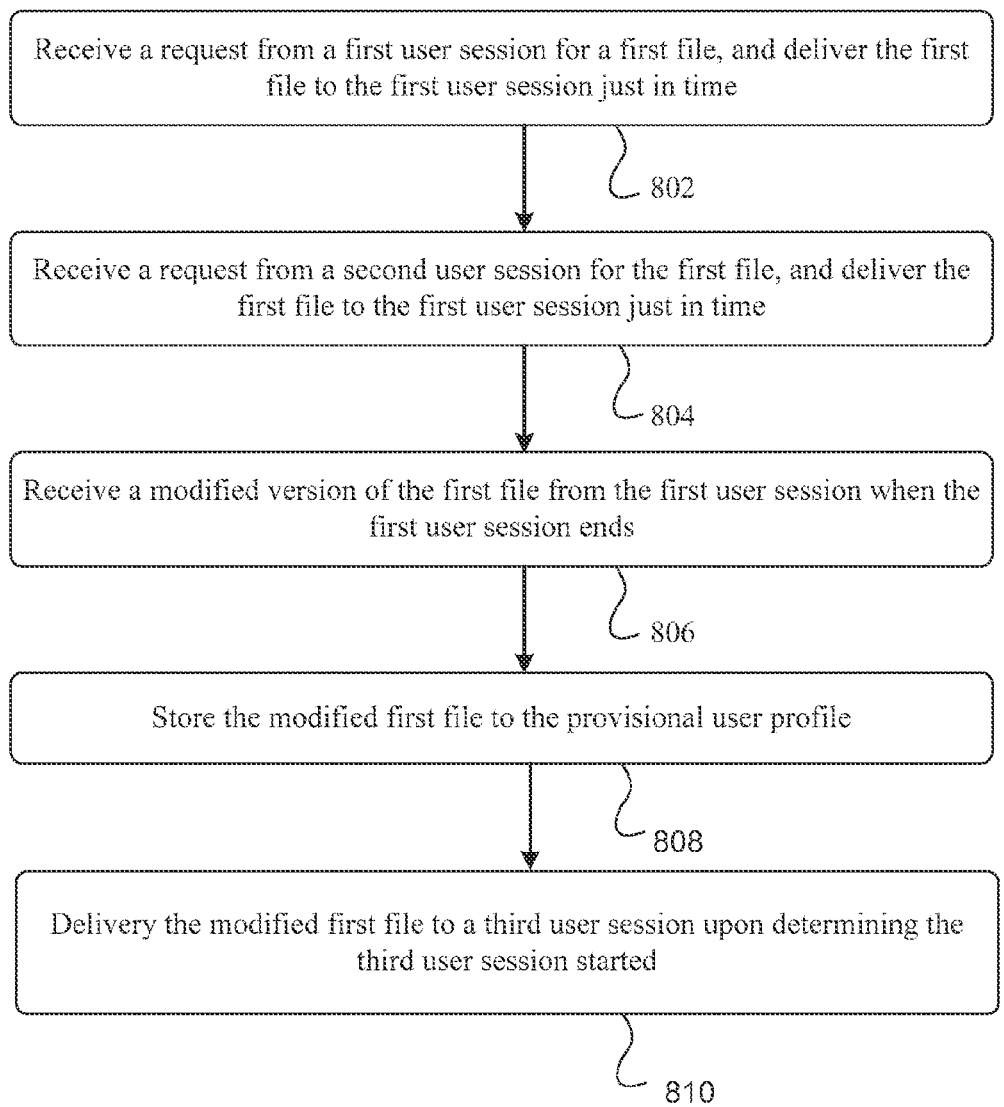
FIG. 7 is a flow diagram of one embodiment of a method for mitigating profile inconsistencies.

Illustrated in FIG. 7 is one embodiment of a method for mitigating profile inconsistencies. A server agent executing on a computer receives a request from a first user session for a first file and delivers the first file to the first user session just in time (Step 802). The server agent then receives a request from a second user session for the first file and delivers the first file to the first user session just in time (Step 804). Upon receiving from the first user session a modified version of the first file when the first user session ends (Step 806), the server agent stores the modified first file to the provisional user profile (Step 808). The server agent then determines that a third user session started and upon making this determination, delivers the modified first file to the third user session (Step 810).

Further referring to FIG. 7, and in more detail, in one embodiment the server agent receives a request for a first file from the first user session and delivers the first file to the first user session just in time (Step 802). In some embodiments, the first user session can be a first user session of a user. In other embodiments, the server agent delivers the first file from a base user profile to the first user session. The server agent can deliver any files selected from the base user profile just in time.

In one instance, the server agent, upon receiving the request from the first user session and delivering the first file to the first user session, can receives a request from a second user session for the first file. Upon receiving the request from the second user session, the server agent can deliver the first file from the base user profile to the second user session just in time. In some embodiments, the second user session can be a user session of the same user as the user of the first user session. In other embodiments, the server agent delivers the first file from a base user profile to the second user session. The second user session and the first user session, in some embodiments, can execute substantially simultaneously.

The server agent can receive a modified first file from the first user session when the first user session ends (Step 806). In one embodiment, the first user session, upon receiving the first file, can modify the first file. Modifications to the first file can include any modification described herein. When any user session ends or terminates, in some embodiments the server agent can write all file modifications to the provisional user profile. Thus, in one embodiment, when the first user session ends or terminates, the server agent can write the modification made to the first file to the provisional user profile. Writing a modification to the provisional user profile can include storing the modified version of the file in the provisional user profile. The server agent, in some embodiments, can retrieve the modified user profile information from a terminated user session upon receiving an indicator such as a notice or flag that indicates that the user session ended.

Upon receiving the modified first file from the first user session, the server agent can store the modified first file in a provisional user profile (Step 808). In some embodiments, storing the modified file to a provisional user profile can include writing the file modifications to the provisional user profile.

The server agent, after storing the modified first file to the provisional user profile, can delivery the modified first file to a third user session upon determining the third user session started (Step 810). In some embodiments, the third user session can execute at the same time as the second user session, but not at the same time as the first user session. Similarly, the third user session can be a user session of the same user as the user of the first user session and the second user session. Thus, the user can have multiple user sessions, e.g. the first, second and third user session. In some embodiments, the server agent can determine the third user session started using any of the methods described herein. In other embodiments, the server agent can determine the third user session started responsive to receiving an indication that another user session associated with the user started, or responsive to receiving another request to establish a user session for the user.

In one aspect the server agent can copy the contents of the provisional user profile to a user session when that user session starts, and when that user session executes concurrently with another user session of the same user. In some embodiments, copying the contents of the provisional user profile to a user session can include streaming or downloading all modified files and information to the user session.

In one embodiments, the server agent, upon determining that the third user session started, delivers the modified first file to the third user session. In some embodiments, the server agent delivers all contents of the provisional user profile to the third user session upon determining that the third user session started. Delivery all the contents can include delivering the modified first file when the provisional user profile contains only the modified first file. In some embodiments, the server agent can further receive a request from a third user session for a second file, and can delivery the second file from the base user profile to the third user session just in time. In these embodiments, the second file was not included in the provisional user profile, therefore the second file was streamed from the base user profile just in time.

The methods and systems described herein may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While these methods and systems have been shown and described with reference to specific preferred embodiments, it should be understood by those skilled in the art that various changes in form and detail may be made therein.

What is claimed is:

1. A method of just in time delivery of a user profile to overlapping user sessions, the method comprising:

receiving, by a server agent executing on at least one processor of a computer, a request from a first user session for a first file of a user profile of a virtual machine of a user comprising a plurality of files;

retrieving, by the server agent responsive to receiving the first user session request, the first file from a base user profile of the user;

delivering, by the server agent just in time, the first file to the first user session;

receiving, by the server agent, during execution of the first user session, a request from a second user session for the first file and a second file of the plurality of files of the user profile, the second user session and the first user session overlapping;

identifying, by the server agent responsive to receiving the second user session request, a modified version of the first file in a provisional user profile of the virtual machine of the user;

retrieving, by the server agent responsive to identifying the modified first file in the provisional user profile, the modified first file from the provisional user profile and the second file from the base user profile;

delivering, by the server agent just in time, the modified first file and the second file to the second user session;

determining, by the server agent, the first user session and the second user session terminated; and merging, by the server agent, the provisional user profile with the base user profile to update the base user profile responsive to the first user session and the second user session terminating.

2. The method of claim 1 further comprising:

determining the first user session modified the first file; and storing, by the server agent, the modified first file in the provisional user profile responsive to the first user session modification of the first file.

3. The method of claim 1 further comprising:

updating the base user profile with the provisional user profile; and removing, by the server agent, substantially all profile information from the provisional user profile after the updating.

4. The method of claim 1 further comprising:

determining, by the server agent, the first user session and the second user session terminated; and updating file paths and file names within the base user file based on the provisional file directory.

5. The method of claim 1 further comprising:
responsive to the receiving the request from the first user session for the first file of the user profile, searching the provisional user profile for the first file; and
retrieving the first file from the base user profile based on a determination that the provisional user profile does not include the first file.

6. The method of claim 1 further comprising:
streaming the first file to the first user session.

7. The method of claim 1 further comprising:
monitoring, by the server agent, a list of active user sessions, the list of active user sessions comprising the first user session and the second user session;
receiving, by the server agent, at least one notification indicating that each of the active user sessions in the list terminated; and
merging the provisional user profile and the base user profile responsive to the at least one notification.

8. The method of claim 1 further comprising:
identifying files residing in both the provisional user profile and the base user profile; and
replacing the files in the base user profile with the files in the provisional user profile to update the base user profile responsive to the first user session and the second user session terminating.

9. The method of claim 1 further comprising:
identifying files residing in the provisional user profile and not residing in the base user profile; and
copying the files into the base user profile responsive to the first user session and the second user session terminating.

10. A system for just in time delivery of a user profile to overlapping user sessions, the system comprising:
a user profile of a user;
a base user profile of the user;
a provisional user profile of the user; and
at least one processor configured to execute a server agent, the server agent configured to:
receive a request from a first user session for a first file of a user profile of a virtual machine of a user comprising a plurality of files;
retrieving, responsive to receiving the first user session request, the first file from a base user profile of the user;
deliver, just in time, the first file to the first user session;
receive, during execution of the first user session, a request from a second user session for the first file and a second file of the plurality of files of the user profile, the second user session and the first user session overlapping;
identify, responsive to receiving the second user session request, a modified version of the first file in a provisional user profile of the virtual machine of the user;
retrieve, responsive to identifying the modified first file in the provisional user profile, the modified first file from the provisional user profile and the second file from the base user profile;
deliver, just in time, the modified first file and the second file to the second user session;
determine the first user session and the second user session terminated; and
merge the provisional user profile with the base user profile to update the base user profile responsive to the first user session and the second user session terminating.

11. The system of claim 10, wherein the server agent is further configured to:
determine the first user session modified the first file; and
store the modified first file in the provisional user profile responsive to the first user session modification of the first file.

12. The system of claim 10, wherein the server agent is further configured to:
update the base user profile with the provisional user profile; and
remove substantially all profile information from the provisional user profile after the updating.

13. The system of claim 10, wherein the server agent is further configured to:
determine the first user session and the second user session terminated; and
update file paths and file names within the base user file based on the provisional file directory.

14. The system of claim 10, wherein the server agent is further configured to:
search, responsive to receiving the request from the first user session for the first file of the user profile, the provisional user profile for the first file; and
retrieve the first file from the base user profile based on a determination that the provisional user profile does not include the first file.

15. The system of claim 10, wherein the server agent is further configured to:
stream the first file to the first user session.

16. The system of claim 10, wherein the server agent is further configured to:
monitor a list of active user sessions, the list of active user sessions comprising the first user session and the second user session;
receive at least one notification indicating that each of the active user sessions in the list terminated; and
merge the provisional user profile and the base user profile responsive to the at least one notification.

17. The system of claim 10, wherein the server agent is further configured to:
identify files residing in both the provisional user profile and the base user profile; and
replace the files in the base user profile with the files in the provisional user profile to update the base user profile responsive to the first user session and the second user session terminating.

18. The system of claim 10, wherein the server agent is further configured to:
identify files residing in the provisional user profile and not residing in the base user profile; and
copy the files into the base user profile responsive to the first user session and the second user session terminating.

* * * * *